United States Patent
Bhatia et al.

(10) Patent No.: US 11,461,634 B2
(45) Date of Patent: Oct. 4, 2022

(54) GENERATING HOMOGENOUS USER EMBEDDING REPRESENTATIONS FROM HETEROGENEOUS USER INTERACTION DATA USING A NEURAL NETWORK

(71) Applicant: Adobe Inc., San Jose, CA (US)

(72) Inventors: Vidit Bhatia, San Jose, CA (US); Vijeth Lomada, San Jose, CA (US); Haichun Chen, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 686 days.

(21) Appl. No.: 16/149,347

(22) Filed: Oct. 2, 2018

(65) Prior Publication Data

US 2020/0104697 A1    Apr. 2, 2020

(51) Int. Cl.
*G06N 3/08* (2006.01)
*G06N 5/02* (2006.01)
*G06F 16/28* (2019.01)

(52) U.S. Cl.
CPC ............. *G06N 3/08* (2013.01); *G06F 16/285* (2019.01); *G06N 5/022* (2013.01)

(58) Field of Classification Search
CPC ........ G06N 3/08; G06N 5/022; G06F 16/285; G06F 16/248
See application file for complete search history.

(56) References Cited

U.S. PATENT DOCUMENTS

| | | | |
|---|---|---|---|
| 10,096,319 B1 | 10/2018 | Jin et al. | |
| 10,134,058 B2 * | 11/2018 | Dasdan | G06Q 30/0275 |
| 11,004,135 B1 * | 5/2021 | Sandler | G06Q 30/0631 |
| 2002/0184047 A1 | 12/2002 | Plotnick et al. | |
| 2006/0212900 A1 | 9/2006 | Ismail et al. | |
| 2013/0117329 A1 | 5/2013 | Bank et al. | |
| 2014/0075464 A1 | 3/2014 | McCrea | |
| 2015/0186478 A1 | 7/2015 | Yan et al. | |
| 2016/0232456 A1 | 8/2016 | Jain et al. | |
| 2016/0274744 A1 | 9/2016 | Neumann et al. | |
| 2018/0075336 A1 | 3/2018 | Huang et al. | |
| 2018/0225368 A1 | 8/2018 | Grond | |
| 2019/0311098 A1 * | 10/2019 | Baldwin | G06F 21/32 |
| 2019/0362220 A1 | 11/2019 | Yap et al. | |
| 2020/0005196 A1 * | 1/2020 | Cai | G06F 16/9535 |
| 2020/0073953 A1 * | 3/2020 | Kulkarni | G06F 16/248 |

OTHER PUBLICATIONS

Dai et al., "Deep Coevolutionary Network: Embedding User and Item Features for Recommendation", Feb. 28, 2017, arXiv, pp. 1-10 (pdf pagination). (Year: 2017).*

(Continued)

*Primary Examiner* — Ying Yu Chen
(74) *Attorney, Agent, or Firm* — Keller Preece PLLC

(57) ABSTRACT

The present disclosure relates to systems, non-transitory computer-readable media, and methods for generating user embeddings utilizing an interaction-to-vector neural network. For example, a user embeddings system transforms unorganized data of user interactions with content items into structured user interaction data. Further, the user embeddings system can utilize the structured user interaction data to train a neural network in a semi-supervised manner and generate uniform vectorized user embeddings for each of the users.

19 Claims, 15 Drawing Sheets

(56) References Cited

OTHER PUBLICATIONS

Maheshwary et al., "Deep Secure: A Fast and Simple Neural Network based approach for User Authentication and Identification via Keystroke Dynamics", Aug. 2017, ResearchGate, pp. 1-8 (pdf pagination). (Year: 2017).*
Yuan et al., "Insider Threat Detection with Deep Neural Network", Jun. 12, 2018, ICCS 2018, LNCS 10860, pp. 43-54. (Year: 2018).*
Hochreiter, Sepp; Schmidhuber, Jürgen; "Long Short-Term Memory"; published in Neural Computation Journal; vol. 9 Issue 8, Nov. 15, 1997; pp. 1735-1780.
Yuan, Shuhan; Zheng, Panpan; Wu, Xintao; Xiang, Yang; "Wikipedia Vandal Early Detection: from User Behavior to User Embedding" Published 2017 in ECML/PKDD; DOI:10.1007/978-3-319-71249-9_50.
Dai, Hanjun; Wang,Yichen; Trivedi, Rakshit; Song, Le; "Deep Coevolutionary Network: Embedding User and Item Features for Recommendation"; arXiv:1609.03675v4 [cs.LG] Feb. 28, 2017.
U.S. Appl. No. 16/149,357, Aug. 17, 2020, Notice of Allowance.
U.S. Appl. No. 16/149,418, Jul. 8, 2020, Preinterview 1st Office Action.
U.S. Appl. No. 16/149,357, Apr. 14, 2020, Office Action.
U.S. Appl. No. 16/149,418, Jan. 14, 2021, Office Action.
U.S. Appl. No. 16/149,418, May 25, 2021, Office Action.
U.S. Appl. No. 16/149,418, Oct. 29, 2021, Notice of Allowance.

* cited by examiner

User Interaction Table 300

| Content ID ⌐310 | Interaction Type ⌐320 | Interaction Timestamp ⌐330 | User ID ⌐340 |
|---|---|---|---|
| CID 1 | Open | 9:05 | User 1 |
| CID 2 | Viewed All | 9:10 | User 1 |
| CID 1 | Clicked | 9:15 | User 1 |
| CID 2 | Viewed 20-30 Seconds | 9:06 | User 2 |
| CID 1 | Open | 9:30 | User 3 |
| CID 2 | Skipped Viewing | 9:48 | User 3 |
| CID 1 | Clicked | 9:12 | User 4 |
| CID 2 | Skipped Viewing | 9:32 | User 4 |
| CID 1 | Open | 9:23 | User 5 |
| CID 2 | Clicked | 9:29 | User 5 |
| CID 2 | Viewed All | 9:34 | User 6 |
| CID 2 | Viewed All | 9:38 | User 7 |
| CID 2 | Viewed All | 9:13 | User 8 |

*Fig. 3A*

User Interaction Table 300

| Content ID | Interaction Type | Interaction Timestamp | User ID |
|---|---|---|---|
| CID 1 | Open | 9:05 | User 1 |
| CID 1 | Clicked | 9:15 | User 1 |
| CID 1 | Open | 9:30 | User 3 |
| CID 1 | Clicked | 9:12 | User 4 |
| CID 1 | Open | 9:23 | User 5 |
| CID 1 | Clicked | 9:29 | User 5 |
| CID 2 | Viewed All | 9:10 | User 1 |
| CID 2 | Viewed 20-30 Seconds | 9:06 | User 2 |
| CID 2 | Skipped Viewing | 9:48 | User 3 |
| CID 2 | Skipped Viewing | 9:32 | User 4 |
| CID 2 | Viewed All | 9:34 | User 6 |
| CID 2 | Viewed All | 9:38 | User 7 |
| CID 2 | Viewed All | 9:13 | User 8 |

*Fig. 3B*

User Interaction Table 300

| Content ID | Interaction Type | Interaction Timestamp | User ID |
|---|---|---|---|
| CID 1 | Clicked (4) | 9:15 | User 1 |
| CID 1 | Clicked (4) | 9:12 | User 4 |
| CID 1 | Clicked (4) | 9:29 | User 5 |
| CID 1 | Open (2) | 9:05 | User 1 |
| CID 1 | Open (2) | 9:30 | User 3 |
| CID 1 | Open (2) | 9:23 | User 5 |
| CID 2 | Viewed All (8) | 9:10 | User 1 |
| CID 2 | Viewed All (8) | 9:34 | User 6 |
| CID 2 | Viewed All (8) | 9:38 | User 7 |
| CID 2 | Viewed All (8) | 9:13 | User 8 |
| CID 2 | Viewed 20-30 Seconds (6) | 9:06 | User 2 |
| CID 2 | Skipped Viewing (1) | 9:48 | User 3 |
| CID 2 | Skipped Viewing (1) | 9:32 | User 4 |

310 — Content ID; 320 — Interaction Type; 330 — Interaction Timestamp; 340 — User ID

*Fig. 3C*

User Interaction Table 300

| Content ID | Interaction Type | Interaction Timestamp | User ID |
|---|---|---|---|
| CID 1 | Clicked | 9:12 | User 4 |
| CID 1 | Clicked | 9:15 | User 1 |
| CID 1 | Clicked | 9:29 | User 5 |
| CID 1 | Open | 9:05 | User 1 |
| CID 1 | Open | 9:23 | User 5 |
| CID 1 | Open | 9:30 | User 3 |
| CID 2 | Viewed All | 9:10 | User 1 |
| CID 2 | Viewed All | 9:13 | User 8 |
| CID 2 | Viewed All | 9:34 | User 6 |
| CID 2 | Viewed All | 9:38 | User 7 |
| CID 2 | Viewed 20-30 Seconds | 9:06 | User 2 |
| CID 2 | Skipped Viewing | 9:32 | User 4 |
| CID 2 | Skipped Viewing | 9:48 | User 3 |

*Fig. 3D*

| User ID |
|---------|
| User 4 |
| User 1 |
| User 5 |
| User 1 |
| User 5 |
| User 3 |
| User 1 |
| User 8 |
| User 6 |
| User 7 |
| User 2 |
| User 4 |
| User 3 |

Fig. 3E

GENERATING HOMOGENOUS USER EMBEDDING REPRESENTATIONS FROM HETEROGENEOUS USER INTERACTION DATA USING A NEURAL NETWORK

BACKGROUND

Advancements in computer and communication technologies have resulted in improved digital content dissemination systems for generating and providing digital content to client devices across computing networks. For example, conventional digital content dissemination systems can execute digital content campaigns of various scales that provide customized digital content items to client devices of individual users in real-time. Further, content dissemination systems can provide digital content items to potential customers via a number of different media channels, such as instant messages, emails, digital alerts, advertisement displays, impressions, notifications, search results, websites, or texts.

Indeed, users routinely access millions of websites or applications a day. Furthermore, a single website, application, or Uniform Resource Locator may receive thousands to millions of visits or views a day. With such large quantities of network destinations and visits, web administrators and marketers often seek to gather information concerning users. In some instances, a web administrator may seek to identify a specific segment of users who have certain characteristics or who have demonstrated a certain pattern of behavior.

The amount of analytic data a system may collect for even a single website or application may be unwieldy or too difficult to manage or mine. The amount of data can be particularly problematic for websites or applications that receive thousands or millions of daily visitors or users. Conventional analytics engines often lack the ability to identify and organize captured data in a meaningful way. Even the conventional analytics engines that possess this ability, however, consume significant processing power.

Additionally, conventional analytics engines have been unable to efficiently analyze heterogeneous data created by user interactions with content items from a digital content campaign. Indeed, because a digital content campaign can include numerous media channels, and each media channel enables numerous interaction types with content items, conventional analytics engines struggle to encode user behavioral data into uniform representations.

To demonstrate, users interact with content items in various ways in their own capacities. For example, one user performs a single interaction with a single content item while, during the same time period, another user performs multiple various interactions with multiple content items. Because each user's behavior and interaction with content items are different, the user interaction data for each user can appear vastly different from one user to the next, which has prevented most conventional systems from being able to effectively and efficiently compare users based on their interactions with content items.

As another technical shortcoming, conventional analytics engines are often inaccurate and imprecise. To illustrate, users commonly have different reactions to the same content item provided via the same media channel. Likewise, users that experience different content items may have similar interaction behaviors. Conventional analytics engines fail to account for these situations, which cause inaccuracies as well as wasted computing resources and memory both short-term and long-term.

These along with additional problems and issues exist with regard to conventional analytics engines.

BRIEF SUMMARY

Embodiments of the present disclosure provide benefits and/or solve one or more of the foregoing or other problems in the art with systems, non-transitory computer-readable media, and methods for generating uniform homogenous user embedding representations from heterogeneous user interaction data. For instance, the disclosed systems can convert data from user interactions with content items into a uniform representative form. Further, the disclosed systems can analyze and transform the user interaction data into structured data, which the disclosed systems can use to train a neural network, in a semi-supervised manner, to generate vectorized user embeddings for corresponding users. Further, the disclosed systems can utilize the learned user embeddings for various use cases, such as segmentation as well as other deep learning predictive models.

To briefly demonstrate, in one or more embodiments, the disclosed systems obtain user interaction data that includes interaction information about users interacting with content items. Using this data, the disclosed systems can determine interaction types and interaction times for each user. Further, the disclosed systems can partition the user interaction data based on content items such that various types of interactions with each content item are grouped together. In addition, for each content item group, the disclosed systems can further organize the user interaction data into a hierarchy structure based on the interaction type as well as the interaction time. Then, using the structured user interaction data, the disclosed systems can generate user embeddings for each user through training an interaction-to-vector neural network.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 3A-3E illustrate diagrams of organizing heterogeneous user interaction data into a training data for the interaction-to-vector neural network in accordance with one or more embodiments.

DETAILED DESCRIPTION

Figure 1:
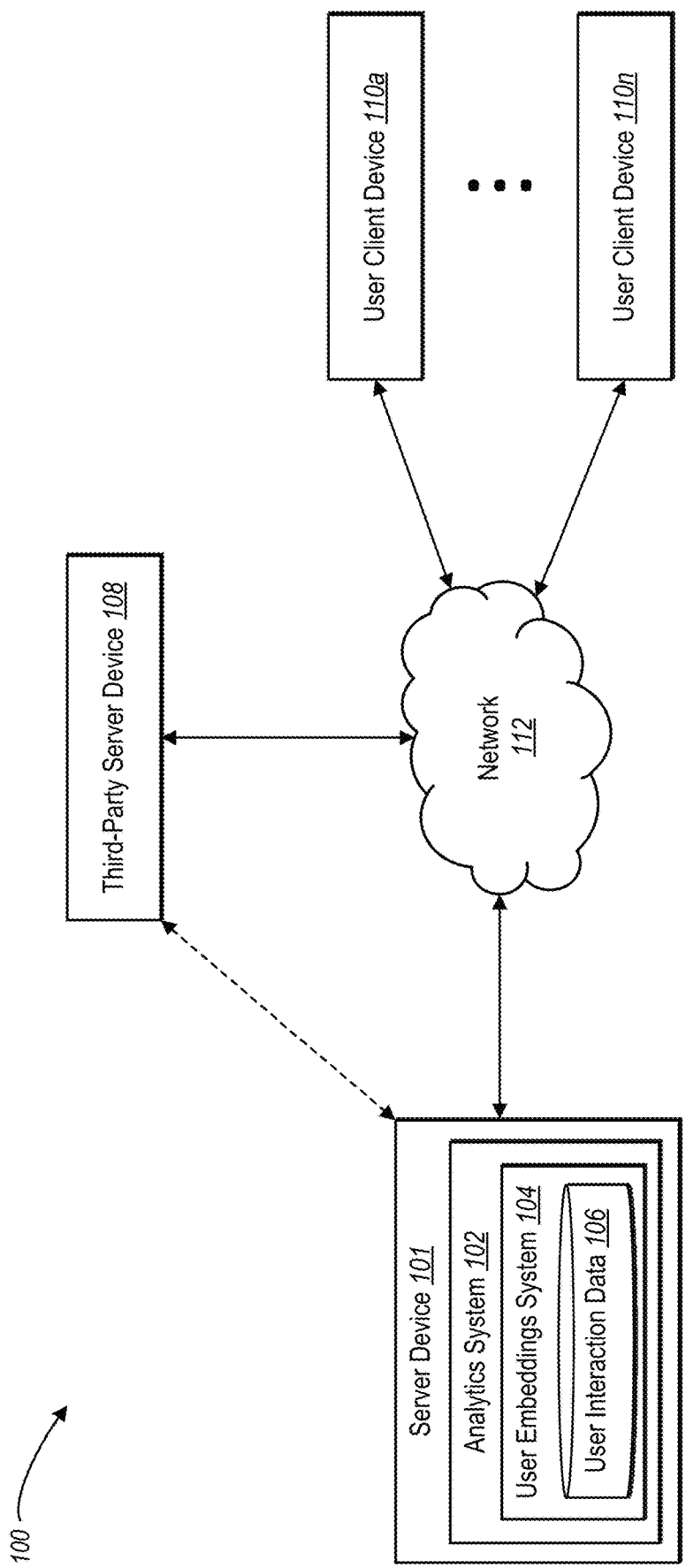
FIG. 1 illustrates a diagram of an environment in which a user embeddings system can operate in accordance with one or more embodiments.

This disclosure describes one or more embodiments of a user embeddings system that generates uniform homogenous user embeddings from heterogeneous user interaction data by employing an interaction-to-vector neural network. For instance, in one or more embodiments, the user embeddings system transforms unorganized data of user interactions with content items into structured user interaction data. Further, the user embeddings system can utilize the structured user interaction data to train a neural network in a semi-supervised manner and generate vectorized user embeddings for users. Indeed, various embodiments of the user embeddings system provide standardized user representations (e.g., user embeddings) of each user's interactive behavior with respect to content items.

To illustrate, in one or more embodiments, the user embeddings system can receive user interaction data that includes indications of users performing interactions with content items. For each user interaction in the user interaction data, the user embeddings system can determine which user is performing the interaction, the type of user interaction that occurred, and the time that the user interaction occurred. In addition, in the above embodiments, the user embeddings system can partition the user interaction data into groups or subsets according to content item (e.g., a content item group). Further, the user embeddings system can organize the user interaction data in each content item group into a hierarchy structure based on the interaction type as well as the time that the corresponding interaction occurred. Moreover, the user embeddings system can generate user embeddings for each user by utilizing the organized user interaction data in conjunction with an interaction-to-vector neural network.

As mentioned previously, user interaction data can provide indications of users performing interactions with content items. For example, in various embodiments, user interaction data identifies each user (e.g., a user identifier) and the content item (e.g., a content item identifier) with which the user interacted, how the user interacted with a content item (e.g., an interaction type), and the time of the interaction (e.g., an interaction timestamp). A few examples of content items include images, text, graphics, messages, animations, reviews, notifications, or summaries. Some examples of interaction types include downloading, viewing, selecting, or sharing a content item.

In addition, as mentioned above, the user interaction data is heterogeneous. Indeed, each time a user performs an interaction with a content item, the user embeddings system may add the user to a database or table of user interactions. Because the user decides the amount, frequency, and type of each interaction, the user interaction data can include a number of users that have different numbers and types of interactions. Further, due to the variation in interaction data associated with each user, the user interaction data as a whole is imbalanced and irregular.

Further, the user embeddings system transforms the heterogeneous user interaction data into uniform user embeddings. In particular, the user embeddings system can structure the user interaction data. To illustrate, in one or more embodiments, the user embeddings system partitions the user interaction data by content item. For instance, the user embeddings system groups user interactions with the same content item together. In some embodiments, the content item groups are arranged based on time according to when the first interaction with each content item occurred.

In addition, the user embeddings system can further structure the user interaction data within each content item group. For example, in one or more embodiments, the user embeddings system organizes each content item group according to an interaction type (e.g., based on comparing interaction strength). Further, in some embodiments, the user embeddings system arranges each subgroup of interaction types by interaction time (e.g., temporal ordering). In this manner, the user embeddings system forms a hierarchy structure of user interaction data. An example of structured user interaction data is provided in connection with FIGS. 3C and 3D below.

Also, as mentioned above, the user interaction data includes user identifiers for each user interaction. In particular, each user interaction is associated with a user identifier. Thus, as the user embeddings system orders and arranges the user interaction data into a hierarchy structure, the user identifiers corresponding to each user interaction are reordered. In various embodiments, the user embeddings system extracts the list of user identifiers arranged according to the structured user interaction data. Alternatively, in some embodiments, the user embeddings system disregards and/or removes the content item information, interaction type, and interaction timestamp for each user interaction in the structured user interaction data until only a list of user identifiers remain.

Upon generating the ordered list of user identifiers, in various embodiments, the user embeddings system trains an interaction-to-vector neural network using the ordered list of user identifiers as training data in a semi-supervised manner. For instance, the user embeddings system trains the interaction-to-vector neural network to learn weights within various hidden matrices that represent each user based on the user interaction data. In some embodiments, the interaction-to-vector neural network is a word2vec type of neural network, such as a neural network employing a skip-gram architecture.

Once trained, in various embodiments, the user embeddings system can extract the learned weights within one or more of the hidden weighted matrices to obtain user embeddings for each user. These user embeddings are uniform for each user irrespective of the number or type of user interactions the user experiences.

In one or more embodiments, the user embeddings system utilizes the user embeddings to compare any two or more users together based on their user interactions. For instance, the user embeddings system can identify clusters and groupings of similar users based on finding similar user embeddings. Further, in some embodiments, the user embeddings system can utilize the user embeddings as features for other machine-learning prediction algorithms.

The user embeddings system provides many advantages and benefits over conventional systems and methods. For example, as mentioned above, the user embeddings system efficiently analyzes heterogeneous data created by user interactions with content items and encodes the user interaction data into a uniform representation. In particular, by transforming the irregular and imbalanced user interaction data into a structured hierarchy and isolating a sequence of user identifiers, the user embeddings system can more accurately determine the effects, weights, and influences resulting from the complex interactions between users and content items. Specifically, the user embeddings system can utilize latent relationships of user interactions among users to train an interaction-to-vector neural network to accurately learn and encode uniform user embeddings for users.

Because the user embeddings system efficiently processes irregular and imbalanced data, the user embeddings system provides increased flexibility over conventional systems. Indeed, the ability of the user embeddings system to efficiently treat heterogeneous data enables the user embeddings system to operate with a wide variety of datasets beyond that of user interactions with content items. In contrast, conventional systems are limited to datasets where irregular data is difficult to use and analyze.

The user embeddings system also improves computer efficiency. Indeed, by more accurately and precisely identifying relationships between user interactions and content items, the user embeddings system can reduce computing resources required to generate, distribute, and monitor unnecessary digital content. As described below, researchers compared embodiments of the user embeddings system to conventional systems for predicting a task and found that the user embeddings system outperformed the conventional systems.

As illustrated by the foregoing discussion, the present disclosure utilizes a variety of terms to describe features and advantages of the user embeddings system. Additional detail is now provided regarding the meaning of such terms. For example, as used herein, the term "content item" refers to digital data (e.g., digital data that may be transmitted over a wired or wireless network). In particular, the term "content item" includes text, images, video, audio and/or audiovisual data. Examples of digital content include images, text, graphics, messages animations, notifications, advertisements, reviews, summaries, as well as content related to a product or service.

In addition, the term "user interaction" (or "interaction") refers to a point of contact between a user and a content item. In some embodiments, the term "user interaction" refers to contact from the user with respect to a content item corresponding to a product or service offered by an entity, such as an individual, group, or business. Examples of user interactions include visiting a website, receiving an email, opening an email, clicking on a link in an email, making a purchase, downloading a native computing application, or downloading, opening, viewing, selecting, playing viewing, pausing, stopping, skipping, continuing viewing, closing, moving, ignoring, resizing, and sharing a content item etc.

User interactions primarily occur via one or more digital media channels (e.g., network-based digital distribution channels). For instance, user interaction is created when a user interacts with a content item via an electronic message, a web browser, or an Internet-enabled application. Examples of digital media channels also include email, social media, webpages, organic search, paid search, and, in-app notifications.

In addition, multiple user interactions can form user interaction data. As used herein, the term "user interaction data" refers to one or more user interactions between users and content items. In many embodiments, user interaction data includes the user identifier and content item identifier associated with a user interaction, the type of user interaction that occurred, and a timestamp of the user interaction.

As mentioned above, user interaction data can include heterogeneous data. As used herein, the term "heterogeneous user interaction data" or "heterogeneous data" refers to irregular or imbalanced user interaction data between users included in user interaction data. The imbalance between users can be due to different numbers of user interactions, different types of user interactions, interactions with different content items, different frequency of user interactions, etc. For instance, one user is included once in the user interaction data while other users are included multiple times. To illustrate, if each user in the user interaction data is represented within a vector of the user's user interaction data, then the heterogeneous user interaction data includes user vectors of different lengths.

As mentioned above, the user embeddings system can train an interaction-to-vector neural network to learn uniform user embeddings. The term "machine learning," as used herein, refers to the process of constructing and implementing algorithms that can learn from and make predictions on data. In general, machine learning may operate by building models from example inputs (e.g., user interaction data), such as training neural network layers and/or matrices, to make data-driven predictions or decisions. Machine learning can include neural networks (e.g., the interaction-to-vector neural network), data-based models, or a combination of networks and models.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using semi-supervisory data to tune parameters of the neural network.

In addition, the term "interaction-to-vector neural network" refers to a neural network that includes an input layer, a hidden layer, and an output layer as well as one or more hidden weighted matrices between each of the layers. In various embodiments, the interaction-to-vector neural network also includes a classification layer and a loss layer. In some embodiments, the interaction-to-vector neural network is a word2vec machine-learning model. In additional embodiments, the interaction-to-vector neural network utilizes a skip-gram architecture during training to learn weights and tune the hidden weighted matrices. Additional detail regarding the interaction-to-vector neural network is provided below in connection with FIGS. 4A-4D.

As used herein, the terms "hidden" or "latent" refer to a vector of numeric values representing hidden and/or latent features. In particular, the term "hidden" includes a set of values corresponding to latent and/or hidden information with respect to user interactions. In one or more embodiments, the interaction-to-vector neural network includes hidden layers and/or weighted matrices that include hidden weights and parameters. For example, hidden or latent data refers to a low-dimensional latent code vector that is used within one or more of the hidden layers or matrices of the interaction-to-vector neural network.

As mentioned above, the user embeddings system can train the interaction-to-vector neural network to learn user embeddings. As used herein, the terms "user embeddings" or "user embedding representations" refer to a vector of numbers/features that represent the behavior of the user encoded in a pre-defined dimension. The features can be learned by the interaction-to-vector neural network. In one or more embodiments, the features comprise latent features. In various embodiments, the number/pre-defined dimension of representative features in a user embedding can be a hyperparameter of the interaction-to-vector neural network and/or learned throughout training the interaction-to-vector neural network.

In some embodiments, the output layer of the interaction-to-vector neural network includes or is associated with a loss layer that has a loss function or loss model to train the interaction-to-vector neural network. As used herein, the term "loss function" or "loss model" refers to a function that indicates training loss. In some embodiments, a machine-learning algorithm can repetitively train to minimize total overall loss. For example, the loss function determines an amount of loss with respect to training data (e.g., the ordered list of user identifiers presented via a context window) by analyzing the output of the interaction-to-vector neural network with the ground truth provided by the training data. The loss function then provides feedback, via back propagation, to one or more layers and matrices of the interaction-to-vector neural network to tune/fine-tune those layers and/or matrices (e.g., depending on the learning rate). Examples of loss functions include a softmax classifier function (with or without cross-entropy loss), a hinge loss function, and a least squares loss function.

Referring now to the figures, FIG. 1 illustrates a diagram of an environment 100 in which the user embeddings system 104 can operate. As shown in FIG. 1, the environment 100 includes a server device 101 and user client devices 110a-110n. In addition, the environment 100 includes a third-party server device 108 (e.g., one or more webservers). Each of the devices within the environment 100 can communicate with each other via a network 112 (e.g., the Internet).

Although FIG. 1 illustrates a particular arrangement of components, various additional arrangements are possible. For example, the third-party server device 108 communicates directly with the server device 101. In another example, the third-party server device 108 is implemented as part of the server device 101 (shown as the dashed line).

In one or more embodiments, users associated with the user client devices 110a-110n can access content items provided by the analytics system 102 and/or the third-party server device 108 via one or more media channels (e.g., websites, applications, or electronic messages). As FIG. 1 illustrates, the environment 100 includes any number of user client devices 110a-110n.

As shown, the server device 101 includes an analytics system 102, which can track the storage, selection, and distribution of content items as well as track user interactions with the content items via the user client devices 110a-110n. The server device 101 can be a single computing device or multiple connected computing devices. In one or more embodiments, the analytics system 102 facilitates serving content items to users (directly or through the third-party server device 108) via one or more media channels to facilitate interactions between the users and the content items.

In some embodiments, the analytics system 102 includes, or is part of, a content management system that executes various content item campaigns across multiple digital media channels. Indeed, the analytics system 102 can facilitate audiovisual content campaigns, online content item campaigns, email campaigns, social media campaigns, mobile content item campaigns, as well as other campaigns. In various embodiments, the analytics system 102 manages advertising or promotional campaigns, which includes targeting and providing content items via various digital media channels in real time to large numbers of users (e.g., to thousands of users per second and/or within milliseconds of the users accessing digital assets, such as websites).

In one or more embodiments, the analytics system 102 employs the user embeddings system 104 to facilitate the various content item campaigns. In alternative embodiments, the analytics system 102 hosts (or communicates with) a separate content management system (e.g., a third-party system) that manages and facilitates various content item campaigns. In these embodiments, the analytics system 102 can communicate user embeddings to aid the third-party system with analytics, targeting, segmentation, or other data analysis.

As shown in FIG. 1, the analytics system 102 includes the user embeddings system 104. The user embeddings system 104 also includes user interaction data 106 that indicates how and when users interacted with various content items. As mentioned above, the user embeddings system 104 generates uniform homogenous user embedding representations from the user interaction data 106. A high-level description of the user embeddings system 104 is provided with respect to FIG. 2. FIGS. 3A-7 provide further detail regarding the user embeddings system 104.

As mentioned above, the environment 100 includes the user client devices 110a-110n. The analytics system 102 (or the third-party server device 108) can provide content items to, and receive indications of user interactions from, the user client devices 110a-110n. In various embodiments, the analytics system 102 communicates with the third-party server device 108 to provide content items to the user client devices 110a-110n. For instance, the analytics system 102 instructs the third-party server device 108 to employ specific media channels when next providing content items to target users based on the user embeddings (e.g., using the user embeddings to make content item distribution predictions).

In one or more embodiments, the user client devices 110a-110n and/or server device 101 may include, but are not limited to, mobile devices (e.g., smartphones, tablets), laptops, desktops, or any other type of computing device, such as those described below in relation to FIG. 8. In addition, the third-party server device 108 (and/or the server device 101) can include or support a web server, a file server, a social networking system, a program server, an application store, or a digital content provider. Similarly, the network 112 may include any of the networks described below in relation to FIG. 8.

The environment 100 can also include an administrator client device. An administrator user (e.g., an administrator, content manager, or publisher) can utilize the administrator client device to manage a content item campaign. For example, a content manager via the administrator client device can provide content items and/or campaign parameters (e.g., targeting parameters, target media properties such as websites or other digital assets, budget, campaign duration, or bidding parameters). Moreover, the content manager via the administrator client device can view content items based on learned user embeddings. For example, with respect to a content item campaign, the administrator employs the administrator client device to access the user embeddings system 104 and view graphical user interfaces that include user embeddings across one or more content item campaigns.

With respect to obtaining user interaction data 106, in one or more embodiments the analytics system 102 and/or the user embeddings system 104 monitors various user interactions, including data related to the communications between the user client devices 110a-110n and the third-party server device 108. For example, the analytics system 102 and/or the user embeddings system 104 monitors interaction data that includes, but is not limited to, data requests (e.g., URL requests, link clicks), time data (e.g., a timestamp for clicking a link, a time duration for a web browser accessing a webpage, a timestamp for closing an application, time duration of viewing or engaging with a content item), path tracking data (e.g., data representing webpages a user visits during a given session), demographic data (e.g., an indicated age, sex, or socioeconomic status of a user), geographic data (e.g., a physical address, IP address, GPS data), and transaction data (e.g., order history, email receipts).

To demonstrate, the third-party server device 108 provides a video via a webpage to a user on the first client device 112a. The analytics system 102 and/or the user embeddings system 104 monitors the user's interactions with the video, such as if the user paused the video, skipped portions of the video, replayed the video, or stopped the video prematurely using a plug-in in a video player that reports information back to the analytics system 102. In addition, the analytics system 102 and/or the user embeddings system 104 monitors the viewing duration of the video, such as if the user watched the whole video, watched less than 20 seconds of the video, watched over 30 seconds of the video, watched at least 25% of the video, or watched particular segments of the video.

The analytics system 102 and/or the user embeddings system 104 can monitor user data in various ways. In one or more embodiments, the third-party server device 108 tracks the user data and then reports the tracked user data to the analytics system 102 and/or the user embeddings system 104. Alternatively, the analytics system 102 and/or the user embeddings system 104 receives tracked user data directly from the user client devices 110a-110n. In particular, the analytics system 102 and/or the user embeddings system 104 may receive information via data stored on the client device (e.g., a browser cookie, cached memory), embedded computer code (e.g., tracking pixels), a user profile, or engage in any other type of tracking technique. Accordingly, the analytics system 102 and/or the user embeddings system 104 can receive tracked user data from the third-party server device 108, the user client devices 110a-110n, and/or the network 112.

Figure 2:
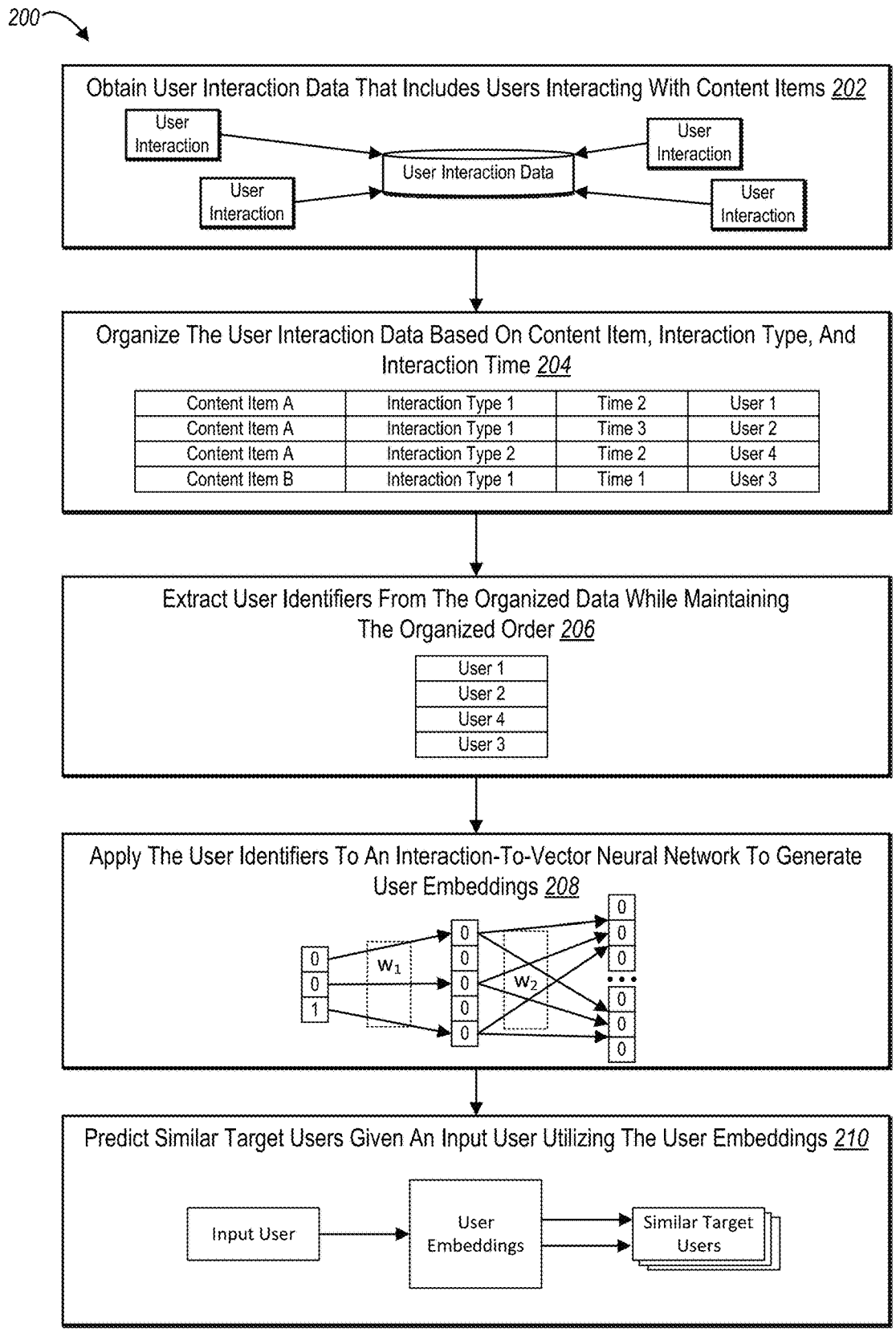
FIG. 2 illustrates a high-level schematic diagram of learning user embeddings from user interaction data by training an interaction-to-vector neural network in accordance with one or more embodiments.

Turning now to FIG. 2, an overview is provided regarding how the user embeddings system 104 generates user embeddings. In particular, FIG. 2 illustrates a general process 200 of learning user embeddings from user interaction data utilizing an interaction-to-vector neural network. In one or more embodiments, the user embeddings system 104 described with respect to FIG. 1 implements the general process 200 to train and employ the interaction-to-vector neural network.

As shown in FIG. 2, the user embeddings system 104 obtains 202 user interaction data that indicates user interactions with content items. Various examples of tracking/receiving user interaction data are provided above. For example, the user embeddings system 104 directly receives user interaction data in response to a user interacting with a content item. In additional embodiments, an analytics system, a third-party server device, and/or a user client device can provide user interaction data to the user embeddings system 104 indicating one or more user interactions between users and content items.

Further, as shown, the user embeddings system 104 can store the user interaction data, such as in a table or database. For example, in association with each user interaction, the user embeddings system 104 stores a user identifier, a content item identifier, an interaction type, and an interaction timestamp. In one or more embodiments, the interaction type is stored as a Boolean flag set for a particular interaction type. In alternative embodiments, the interaction type indicates the trigger event that detected the user interaction (e.g., hover over, click, close, stop, pause, or play).

As shown the user embeddings system 104 organizes 204 the user interaction data based on content item, interaction type, and interaction time. To illustrate, in various embodiments, the user embeddings system 104 sorts the user interaction data in a hierarchy structure. For example, the user embeddings system 104 first organizes the user interaction data by content item, then the interaction type, then the interaction timestamp. Additional detail regarding organizing user interaction data is provided below in connection with FIGS. 3A-3E.

FIG. 2 also includes the user embeddings system 104 extracting 206 user identifiers from the organized user interaction data while maintaining the organization of the user interaction data. For example, in one or more embodiments, the user embeddings system 104 copies the list of user identifiers into a training data vector. In another example, the user embeddings system 104 removes user interaction information from the organized user interaction data until only the list of user identifiers remain. As mentioned, the user embeddings system 104 preserves the order of the user identifiers from the organized user interaction data. By preserving the order of the user identifiers, the user embeddings system 104 can unearth patterns, traits, and habits of user behaviors from the user interaction data, as further described below.

In addition, the user embeddings system 104 applies 208 the user identifiers to an interaction-to-vector neural network to generate user embeddings. For example, in one or more embodiments, the user embeddings system 104 trains a word2vector type of interaction-to-vector neural network utilizing the list of user identifiers as a ground truth. Indeed, the user embeddings system 104 trains the interaction-to-vector neural network to learn latent weights and parameters for each user in the user interaction data. Further, the user embeddings system 104 can draw upon one or more learned weight matrices to determine the user embeddings. Additional detail regarding training the interaction-to-vector neural network to learn user embeddings is provided below in connection with FIGS. 4A-4D.

Once generated, the user embeddings can allow for various data analysis. For example, FIG. 2 includes the user embeddings system 104 predicting 210 similar target users given an input user utilizing the user embeddings. For example, in various embodiments, the user embeddings system 104 can compare the user embeddings of a given user to other user embeddings to find similar or matching users to the given user. Based on this process, the user embeddings system 104 can form groups or clusters of similar users and/or expand a segment of users. Further, the user embeddings system 104 can utilize the user embeddings for a user to determine how likely the user is to perform a future action (e.g., click on a URL link) based on the actions of similar users as determined by the user embeddings.

Turning now to FIGS. 3A-3E, additional detail is provided regarding organizing irregular and imbalanced user interaction data. More specifically, FIGS. 3A-3E illustrate diagrams of organizing heterogeneous user interaction data. To illustrate, FIG. 3A shows a user interaction table 300 of user interaction data that indicates user interactions with content items. As shown, the user interaction table 300 includes a content item identifier 310 (or "content item ID 310"), an interaction type 320, an interaction timestamp 330, and a user identifier 340 (or "user ID 340") for each user interaction.

For ease in explanation, the user interaction table 300 includes a truncated list of user interaction data that includes a reduced number of content items (i.e., CID 1 and CID 2), interaction types 320, and users (i.e., Users 1-8). Further, the user interaction table 300 includes a duration of less than an hour (i.e., 9:05-9:48). While a truncated table of user interaction data is displayed, the user embeddings system 104 can store and organize a user interaction table 300 of any size (e.g., any number of content items, interaction types, over any time period, for any number of users). In addition, the user interaction table 300 can include additional columns of information about the content items (e.g., additional interaction metadata), interaction types, and/or users.

As shown in the user interaction table 300, the first content item can correspond to a user receiving an email or another message where the user can receive the message, open the message, and click (i.e., select) a trackable element within the message (e.g., a URL link). Further, the second content item can correspond to a video (e.g., a video advertisement). As shown, a user can view the entire video, view various portions of the video, or skip viewing of the video. While not shown, the user interaction table 300 can include additional interaction types for each content item.

As FIG. 3A illustrates, the user interaction table 300 is initially arranged according to the user ID 340. In alternative embodiments, the user interaction table 300 is arranged differently. For example, in one embodiment, the user interaction table 300 is initially ordered based on the interaction timestamp 330 of each user interaction (e.g., from oldest interaction to newest user interaction). In another embodiment, the user interaction table 300 is arranged in the order of user interaction data received from outside sources (e.g., from the third-party server device and/or user client devices). In yet another embodiment, the user embeddings system 104 initially arranges the user interaction table 300 randomly or semi-randomly.

Upon obtaining the user interaction data, the user embeddings system 104 can begin to partition, segment, or separate the user interaction data into subsections or groups. For example, in one or more embodiments, the user embeddings system 104 groups entries in the user interaction table 300 based on the content item (e.g., content item ID 310). To illustrate, FIG. 3B shows the user embeddings system 104 arranging the user interaction table 300 by the content item ID 310, with user interactions for the first content item (e.g., CID 1) being listed before user interactions for the second content item (e.g., CID 2).

As also shown, the user embeddings system 104 arranges the first content item (e.g., CID 1) before user interactions for the second content item (e.g., CID 2) based on the first content item occurring before the second content item (e.g., 9:05 for CID 1 and 9:06 for CID 2). In alternative embodiments, the user embeddings system 104 arranges the content items based on the average user interaction time, mean user interaction time, or last interaction timestamp. In some embodiments, the user embeddings system 104 arranges the content items by a content item creation timestamp associated with each content item (e.g., indicated when the content item was created and/or first distributed to a user). Still, in other embodiments, the user embeddings system 104 arranges the content item groups by alphabetical order, reverse alphabetical order, or alphanumerically by the content ID 310.

In various embodiments, the user embeddings system 104 can further organize the user interaction table 300 to add additional structure to the user interaction data. To illustrate, as shown in FIG. 3C, the user embeddings system 104 arranges each content item group based on the interaction type 320. In various embodiments, the user embeddings system 104 arranges the interaction types 320 based on the strength and similarity of each interaction type relative to one another for a content item. To illustrate, FIG. 3C shows each interaction type 320 including a number in parentheses indicating the interaction strength (i.e., an interaction strength factor) of the corresponding interaction. For instance, within the first content item (e.g., email or a message), a user click yields a stronger user interaction type (i.e., 4) than opening the message (i.e., 2). With respect to the second content item (e.g., a video advertisement), a user viewing the entire video has a higher interaction strength factor (i.e., 8) than viewing 20-30 seconds of the video (i.e., 6) or skipping the video (i.e., 1).

In alternative embodiments, the user embeddings system 104 arranges the content items in reverse order of interaction strength. For example, the user embeddings system 104 arranges user interactions from users opening the first content item before user interactions from users clicking or selecting the first user interaction. In other embodiments, the user embeddings system 104 groups the same interaction types for a content item together, without prioritizing the interaction types (e.g., arranging the interaction type groups alphabetically).

When the user embeddings system 104 prioritizes interaction types for user interactions within a content item group based on interaction strength (e.g., strong-to-weak or weak-to-strong), the user embeddings system 104 can encode latent information into the structured user interaction data. In particular, each user interaction entry in the user interaction table 300 provides contextual information about adjacent and/or nearby entries.

To illustrate, in one example, the ninth entry (i.e., CID2, Viewed All, 9:38, User 7) in the user interaction table 300 shown in FIG. 3C shares the same user interaction type as the adjacent above and below entry. Thus, the information from the adjacent above and below entry will highly correlate to information about the ninth entry being taught to the interaction-to-vector neural network during training, which yields increased training accuracy. In another example, the tenth entry (i.e., CID2, Viewed All, 9:13, User 8) in the user interaction table 300 is followed by an entry that has a different interaction type (i.e., Viewed 20-30 Seconds). In this example, the information from a different interaction type may influence the information about the tenth entry during training.

However, by prioritizing a content item group based on interaction strength, the difference between two adjacent entries with different interaction types is minimized. In addition, when dealing with large amounts of data with voluminous entries for each interaction type, the edge case example provided above will generally occur infrequently. Further, for content items with a large number of possible interaction types, the difference in interaction strength between two adjacent prioritized interaction types may be minor (e.g., one interaction type with an interaction strength of 0.25 adjacent to another interaction type with an interaction strength of 0.23). In contrast, if the user embeddings system 104 randomizes groups of interaction types, the difference between interaction strength between two adjacent prioritized interaction types may be significant, particularly in smaller training datasets.

As FIG. 3D illustrates, the user embeddings system 104 can further organize the user interaction data in the user interaction table 300. As shown, the user embeddings system 104 arranges each grouping of similar interaction types by the interaction timestamp 330. In this manner, the user embeddings system 104 pairs users who performed the same type of interaction with the same content item around the same time next to each other in the user interaction table 300. In this manner, the contextual connection between adjacent users is maximized with respect to users interacting with content items.

Further, while not shown, when the user interaction table 300 includes additional categories (e.g., columns), the user embeddings system 104 can organize those categories as part of the hierarchy structure enforced on the user interaction data. The additional categories can be arranged before or after the categories described above (i.e., interaction type and interaction time). In alternative embodiments, the user embeddings system 104 utilizes fewer hierarchy layers when organizing the user interaction data. For example, the user embeddings system 104 organizes the user interaction data first by content item, then by timestamp (without regard to user ID 340 or the interaction type 320).

Upon structuring the user interaction data into a hierarchy structure, the user embeddings system 104 can extract, copy, or isolate a list of user identifiers. For instance, in various embodiments, the user embeddings system 104 copies the list of user IDs 340, as shown in FIG. 3E. Additionally, or alternatively, the user embeddings system 104 removes the other categories in the user interaction table 300 until only the user IDs 340 remain. For example, the user embeddings system 104 removes the content item ID 310, the interaction type 320, and the interaction timestamp 330 from the user interaction table 300 to obtain the ordered list of user IDs 340.

As described in detail below, the user embeddings system 104 trains an interaction-to-vector neural network to learn user embeddings utilizing the ordered list of user identifiers. In various embodiments, the interaction-to-vector neural network follows the architecture of a word2vector neural network, such as the skip-gram model. In word2vector neural networks, systems organize data by words in documents. In some embodiments, documents are akin to the content items IDs 310 and words are akin to the User IDs 340 (e.g., users that interact with a content item). However, unlike word2vector neural networks, the user embeddings system 104 further organizes and sorts user interaction data based on additional categories, such as the user interaction type 320 and the interaction timestamp 330. Thus, the encoding of contextual information among the User IDs 340 is much richer and results in user embeddings that more accurately reflect a user's patterns, traits, habits, and behaviors with respect to interactions with content items.

Indeed, by applying additional hierarchy structure to the user interaction data, the user embeddings system 104 can encode additional information into the list of user IDs 340 shown in FIG. 3E. Indeed, applying the addition hierarchy structure and encoded information into each user ID 340 enables the user embeddings system 104 to utilize a word2vector neural network architecture to go well beyond the scope of word prediction and produce results not previously obtained. Further, by applying techniques from one field of machine-learning (e.g., word prediction) to another field of machine-learning (e.g., user behavior modeling), the user embeddings system 104 can simply and efficiently achieve results that previously were difficult and inefficient to attain.

Figure 4A:
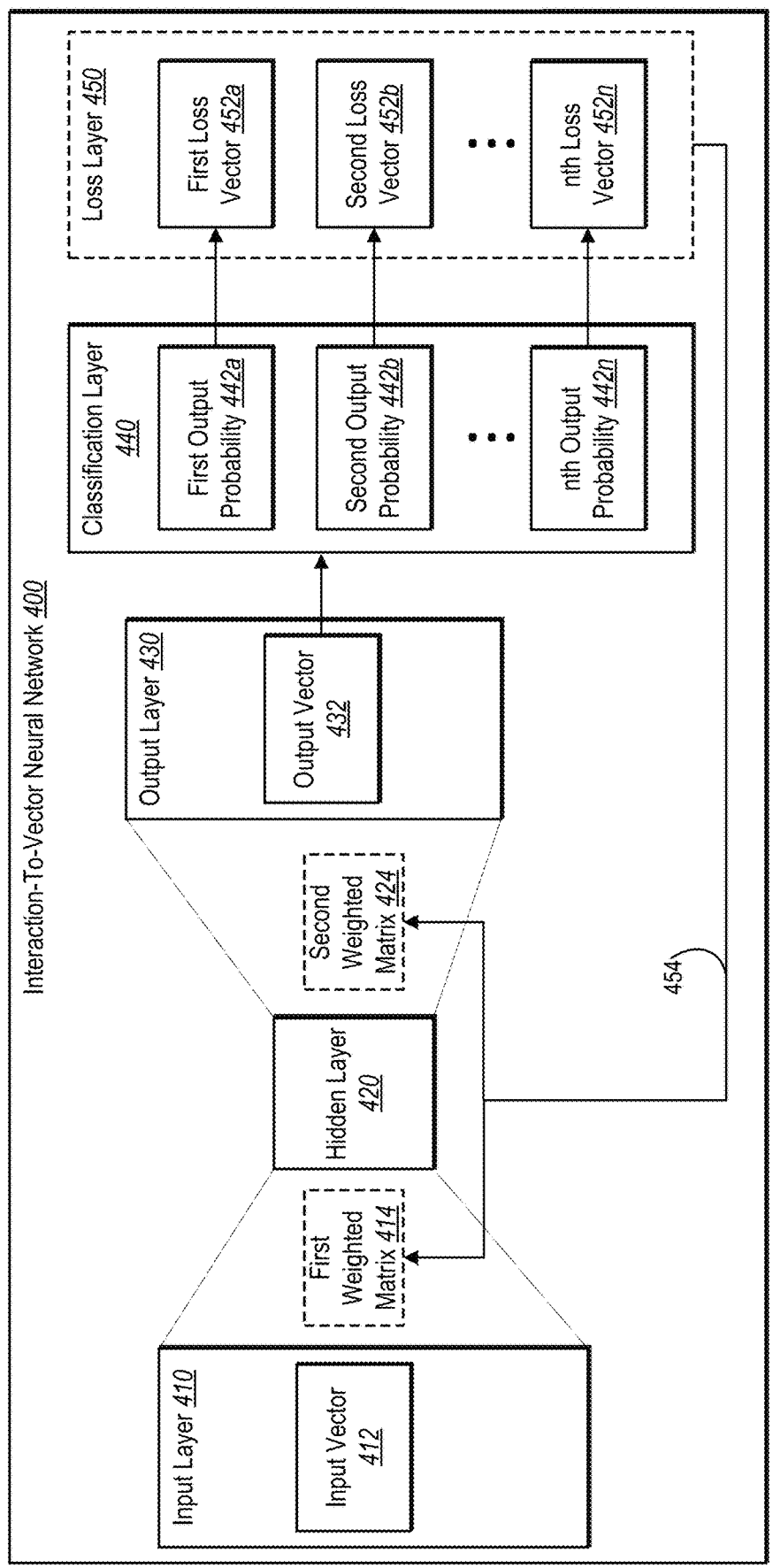
FIGS. 4A-4D illustrate diagrams of training the interaction-to-vector neural network to generate user embeddings in accordance with one or more embodiments.
Figure 4B:
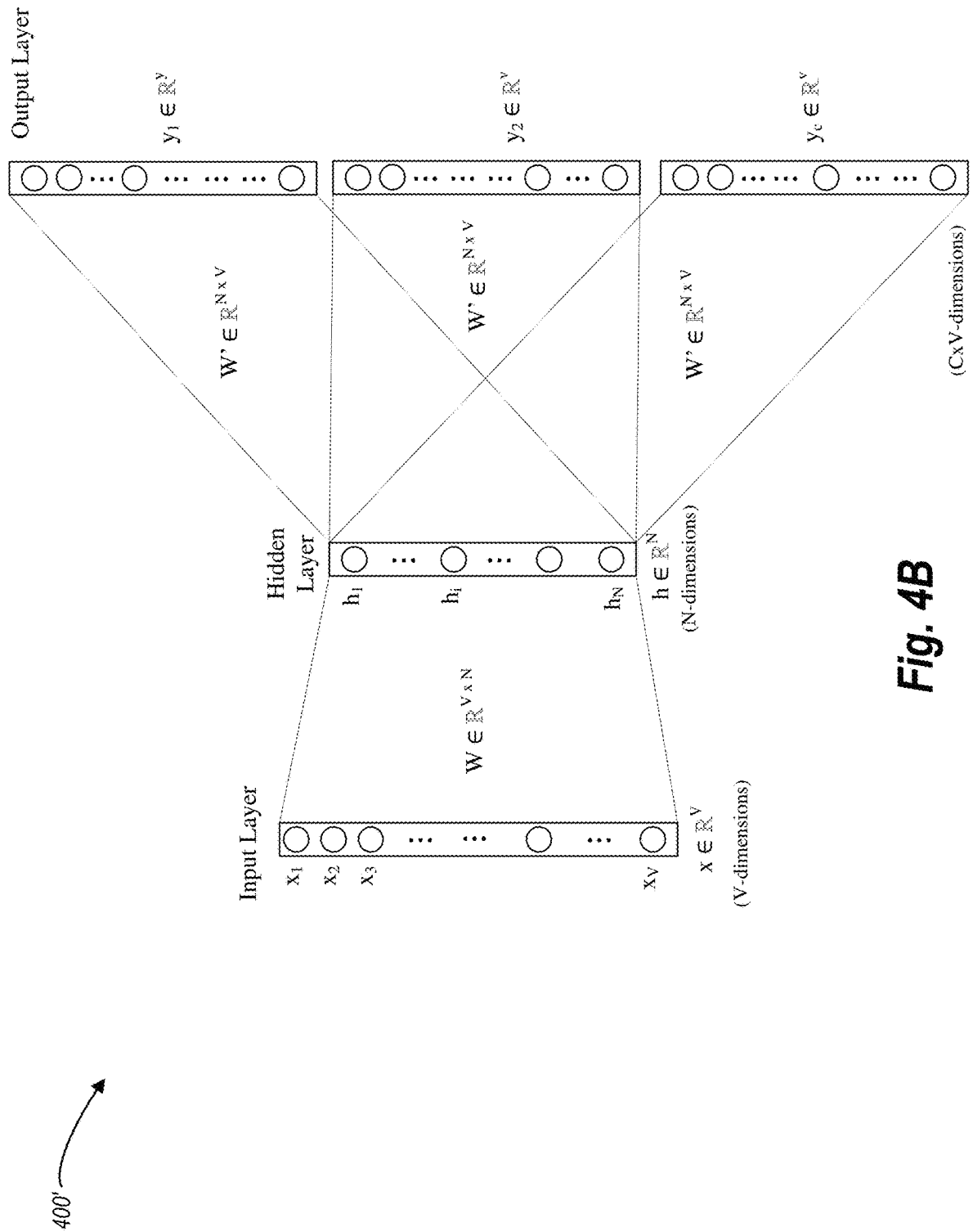
Figure 4C:
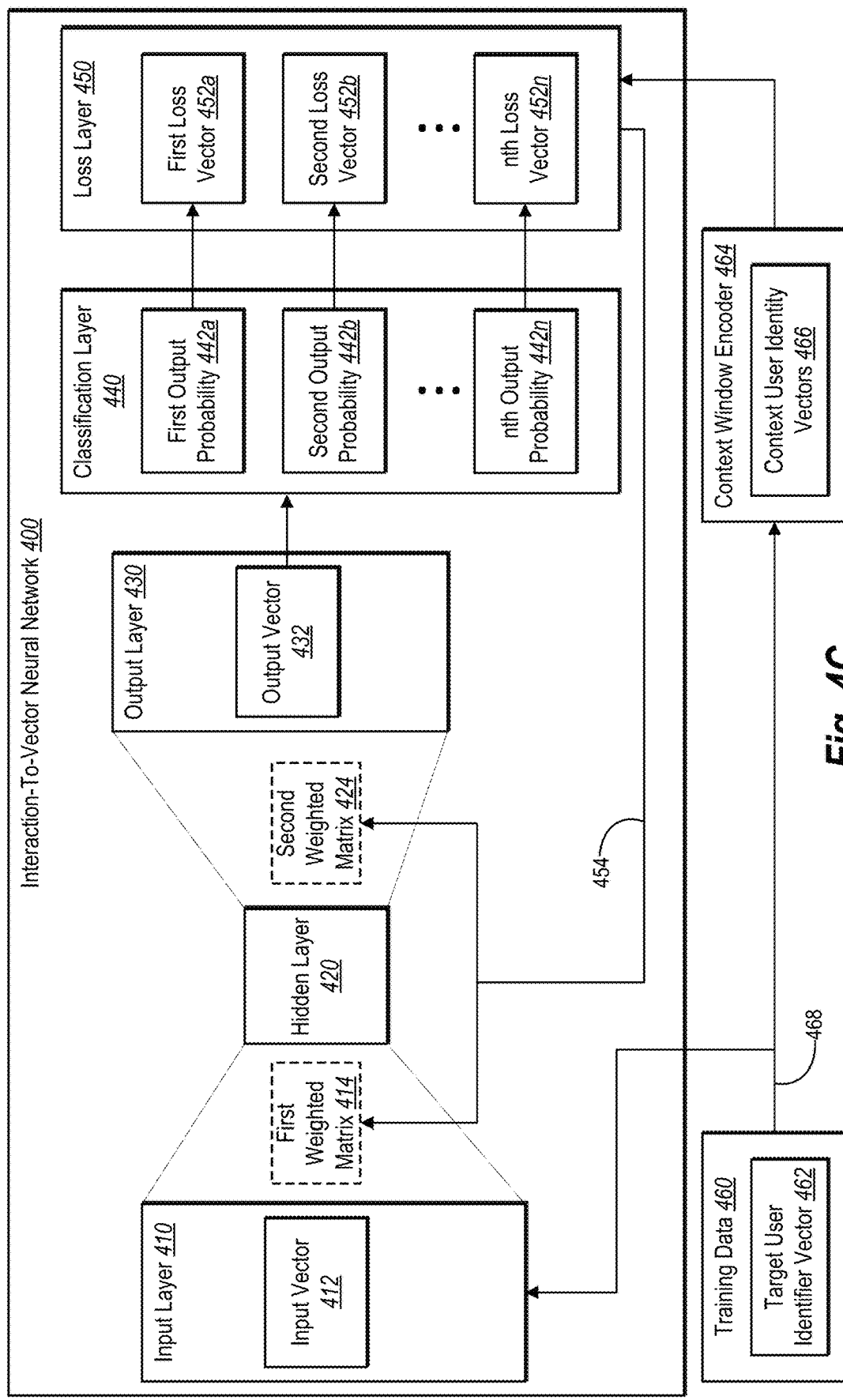
Figure 4D:
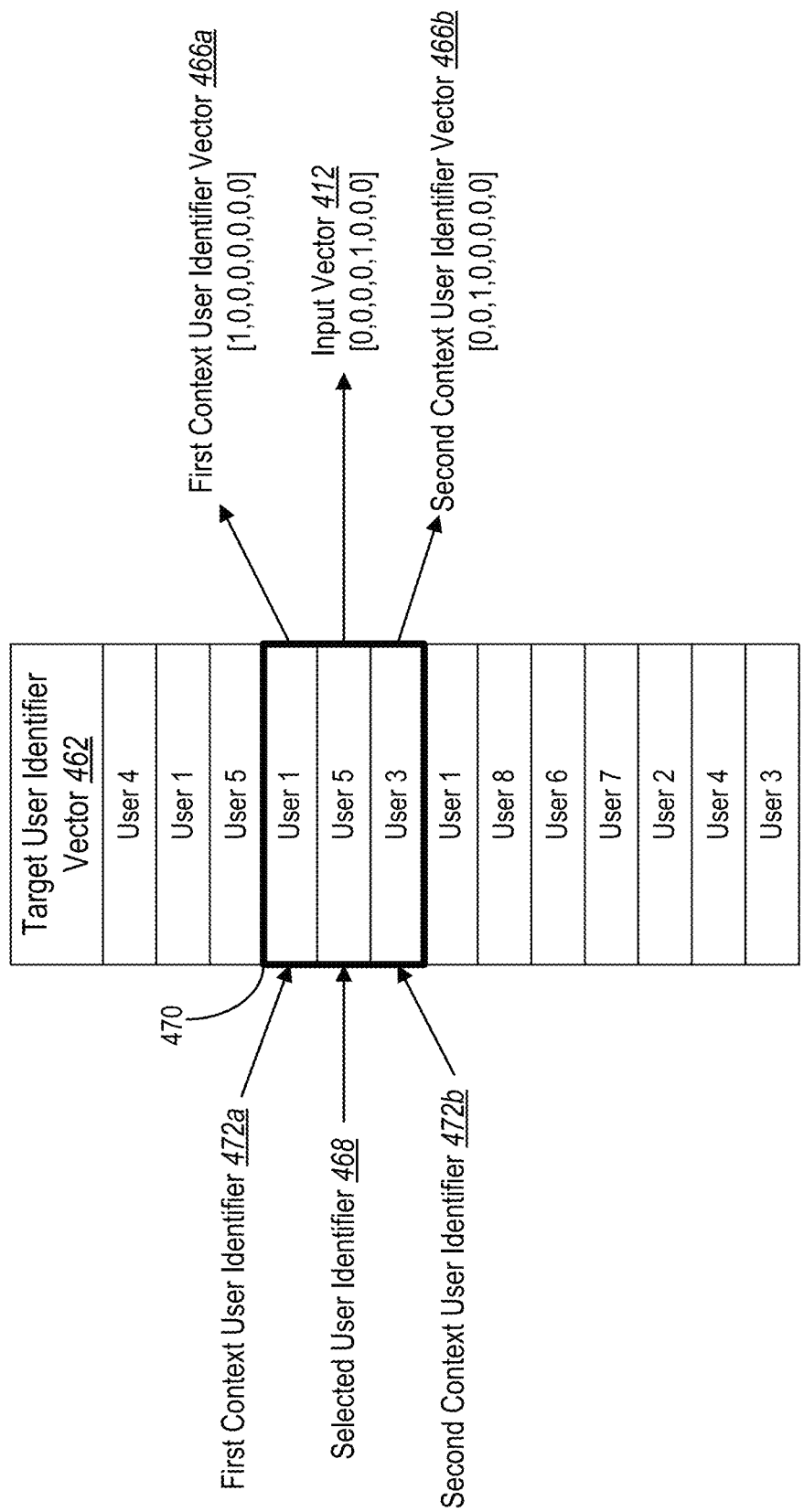

Turning now to FIGS. 4A-4D, additional detail is provided with respect to the interaction-to-vector neural network. More particularly, FIG. 4A illustrates the architecture of an interaction-to-vector neural network. FIG. 4B illustrates an alternate version of an interaction-to-vector neural network. FIG. 4C illustrates training an interaction-to-vector neural network to generate user embeddings based on training data obtained from the list of user identifiers from the user interaction table. FIG. 4D illustrates an example target user identifier vector used to train the interaction-to-vector neural network. In various embodiments, the user embeddings system 104 trains the interaction-to-vector neural network.

Before describing the user embeddings system 104 training the interaction-to-vector neural network 400 in connection with FIG. 4C, detail is first provided with respect to the architecture of the network. In general, the architecture is similar to a word2vector neural network, which is a group of related models that produce word embeddings give sets of words within documents. Commonly, word2vector neural networks are two-layer neural networks that produce a vector space that is hundreds of dimensions. Example of word2vector neural networks include a continuous bag-of-words and a skip-gram neural network. In various embodiments, the user embeddings system 104 utilizes an architecture similar to a skip-gram neural network. However, in other embodiments, the user embeddings system 104 employs a bag-of-words or other type of neural network architecture that vectorizes inputs and creates input embeddings, as further described below.

As illustrated, FIG. 4A includes an interaction-to-vector neural network 400 that includes multiple neural network layers (or simply "layers"). Each illustrated layer can represent one or more types of neural network layers and/or include an embedded neural network. For example, the interaction-to-vector neural network 400 includes an input layer 410, at least one hidden layer 420, an output layer 430, and a classification layer 440. In addition, during training, the interaction-to-vector neural network 400 includes a loss layer 450. As described below, each layer transforms input data into a more usable form for the next layer (e.g., by changing the dimensionality of the input), which enables the interaction-to-vector neural network 400 to analyze features at different levels of abstraction and learn to determine weights and parameters for user embeddings.

In addition, the interaction-to-vector neural network 400 includes a first weighted matrix 414 and a second weighted matrix 424. As shown, the first weighted matrix 414 transforms data from the input vector 412 to the hidden layer 420. Similarly, the second weighted matrix 424 transforms data from the hidden layer 420 to the output layer 430. FIG. 4A illustrates a single first weighted matrix 414 and a single second weighted matrix 424. In some embodiments, the interaction-to-vector neural network 400 includes more than a one second weighted matrix. For example, the interaction-to-vector neural network 400 includes multiple second weighted matrices that are identical or different from each other.

As FIG. 4A illustrates, the input layer 410 is provided an input vector 412. In one or more embodiments, the input vector is a one-hot encoded vector that is sized to include the number of users (e.g., V) found in the user interaction data. For example, if the user interaction data includes 1,000 unique users, the size of the input vector 412 would be 1000×1.

For each user, the user embeddings system 104 creates an input vector 412 where the given user is represented with a one (i.e., 1) and the remaining users are represented as zeros (i.e., 0). In this manner, the input vector 412 is encoded with a one-hot vector representation to indicate which user identifier is being provided as input to the interaction-to-vector neural network 400. Additional detail regarding input vectors is provided below with respect to describing training the interaction-to-vector neural network 400.

The user embeddings system 104 can apply the first weighted matrix 414 to the input vector 412. In one or more embodiments, the first weighted matrix 414 is a hidden matrix that includes weights that correlate each user to each of the features in the hidden layer 420. For example, the size of the first weighted matrix 414 is the number of user identifiers by the number of features (e.g., the embedding size) in the hidden layer 420. Thus, if the number of user identifiers is represented by V and the number of hidden features is represented by N, the size of the first weighted matrix 414 is V×N.

In various embodiments, the user embeddings system 104 initializes the first weighted matrix 414 with a uniform random distribution. For example, the user embeddings system 104 generates a uniform random distribution to populate the size of the first weighted matrix 414 (e.g., the number of users by the number of hidden features). In alternative embodiments, the user embeddings system 104 employs a default set of values to initialize the first weighted matrix 414. Additionally, the user embeddings system 104 randomly initializes the first weighted matrix 414. As described below, the user embeddings system 104 trains and tunes the weights and parameters within the first weighted matrix 414 via the training process.

As mentioned above, the interaction-to-vector neural network 400 includes the hidden layer 420. The hidden layer is sized based on the number of features corresponding to the user embeddings. More particularly, the number of features determines the embedding size of each user embedding.

In one or more embodiments, the number of features is a hyperparameter, or a parameter set upon initializing the interaction-to-vector neural network 400 (e.g., 9, 30, 70, 100, 500, 1,000). In some embodiments, the user embeddings system 104 sets the number of features based on the number of users. For example, the user embeddings system 104 sets the number of features to be half, one-third, double, or plus-or-minus 10% of the number of users in the user interaction data. In other embodiments, the user embeddings system 104 sets the number of features based on the content items and/or the available interaction types. In alternative or additional embodiments, the number of features changes during training until an optimal number of features is determined. In particular, more features reveal additional latent information about a user and the user's context with respect to interacting with content items, but too many features increase the size of each weighted matrix and can make training the interaction-to-vector neural network 400 prohibitive.

As previously mentioned, the second weighted matrix 424 is located between the hidden layer 420 and the output layer 430. Indeed, the second weighted matrix 424 transforms data in the interaction-to-vector neural network 400 from the hidden layer 420 to an output vector in the output layer 430. Accordingly, the size of the second weighted matrix 424 is the number of hidden features (e.g., N) by the number of user identifiers (e.g., V), or N×V.

Furthermore, the user embeddings system 104 initializes the second weighted matrix 424 using one or more of the actions described above in connection with the first weighted matrix 414. For example, the user embeddings system 104 initializes the second weighted matrix 424 using a uniform random distribution.

As also mentioned, the interaction-to-vector neural network 400 can include one or more second weighted matrices. For example, in one or more embodiments, the user embeddings system 104 utilizes a single second weighted matrix 424. In alternative embodiments, the user embeddings system 104 initializes a separate second weighted matrix 424 for each user identifier, where each separate second weighted matrix 424 is individually tuned during training. In these embodiments, the user embeddings system 104 tunes each of the second weighted matrices to learn features corresponding to a particular user identifier.

As shown, the output layer 430 includes an output vector 432. In one or more embodiments, the output vector 432 corresponds to each of the user identifiers. Accordingly, the size of the output vector 432 is similar to the size of the input vector 412, or V×1. In addition, the output vector 432 can include floating point numbers resulting from one or more of second weighted matrices being applied to the hidden layer 420 for a given user identifier (e.g., indicated in the input vector 412). These numbers can be above or below zero.

To illustrate, Equation 1 below provides an example for calculating an output vector for the interaction-to-vector neural network 400.

$$V_O = V_C \times W1 \times W2 \quad (1)$$

In Equation 1, $V_O$ represents an output vector and $V_C$ represents a given input vector for a given user identifier that appears as a one-hot encoded vector (e.g., the input vector 412). Further, W1 represents the first weighted matrix 414 and W2 represents the second weighted matrix 424. Notably, the user embeddings system 104 can calculate separate output vectors 432 for each user identifier input into the interaction-to-vector neural network 400.

As shown in FIG. 4A, the interaction-to-vector neural network 400 also includes the classification layer 440 having output probabilities 442a-442n corresponding to each user identifier. In general, the classification layer 440 generates a probability that each user identifier is similar to a given input user identifier. In various embodiments, the classification layer 440 utilizes a softmax regression classifier to determine this probability.

In many embodiments, the user embeddings system 104 (e.g., via the softmax regression classifier) normalizes the probabilities such that the probability that a given target user identifier is similar to a given input user identifier is between zero and one (i.e., 0-1). Further, as part of normalizing, the user embeddings system 104 ensures that the output probabilities 442a-442n sum to one (i.e., 1). To illustrate, Equations 2 and 3 below provide an example softmax function.

$$\sigma: \mathbb{R}^k \to \left\{ \sigma \in \mathbb{R}^k | \sigma^j > 0, \sum_{i=1}^{K} \sigma^j = 1 \right\} \quad (2)$$

$$e(V_0)_j = \frac{e^{V_{0j}}}{\sum_{k=1}^{Number\ of\ Users} e^{V_{0k}}} \quad (3)$$

Equations 2 and 3 are a generalization of a logistic function that "squashes" a K-dimensional vector $V_0$ of arbitrary real values to a K-dimensional vector $\sigma(V_0)$ of real values, where each entry is in the range (0, 1), and all the entries add up to 1.

As shown in FIG. 4A, the interaction-to-vector neural network 400 includes the loss layer 450 including the loss vectors 452a-452n for each of the output probabilities 442a-442n. In addition, the loss layer 450 provides an error loss feedback vector 454 to train and tune the weighted matrices of the interaction-to-vector neural network 400. In one or more embodiments, the loss layer 450 can provide the error loss feedback vector 454 in a combined error vector, which sums the error loss of each of the loss vectors 452a-452n for each training interaction corresponding to a given input vector 412.

Further, in some embodiments, the loss layer 450 utilizes a loss model to determine an amount of loss (i.e., training loss), which is used to train the interaction-to-vector neural network 400. For example, the loss layer 450 determines training loss by comparing the output probabilities 442a-442n to a ground truth (e.g., training data) to determine the error loss between each of the output probabilities 442a-442n and the ground truth, which is shown as the loss vectors 452a-452n (as described further in FIG. 4C). In particular, the user embeddings system 104 determines the cross-entropy loss between the output probabilities 442a-442n and the training data, as shown in Equation 4. In Equation 4, H(p,q) is the error loss amount between the ground truth (i.e., p) and the output probability (i.e., q).

$$H(p,q) = -\Sigma_x p(x) \log q(x) \quad (4)$$

In addition, using the error loss feedback vector 454, the user embeddings system 104 can train the interaction-to-vector neural network 400 via back propagation until the overall loss is minimized. Indeed, the user embeddings system 104 can conclude training when the interaction-to-vector neural network 400 converges and/or the total training loss amount is minimized. For example, the user embeddings system 104 utilizes the error loss feedback vector 454 to tune the weights and parameters of the first weighted matrix 414 and the second weighted matrix 424 to iteratively minimize loss. In additional embodiments, the user embeddings system 104 utilizes the error loss feedback vector 454 to tune parameters of the hidden layer 420 (e.g., add, remove, or modify neurons) to further minimize error loss.

As mentioned above, the user embeddings system 104 trains the interaction-to-vector neural network 400 in a semi-supervised manner. In particular, the user embeddings system 104 is inhibited from employing a supervised method because the user interaction data is not labeled and the uniqueness of user interactions with content items prevents labels from denoting these interactions. On the other hand, the user embeddings system 104 is inhibited from employing an unsupervised method because the irregular and imbalanced user interaction data prevent the neural network to train itself (e.g., convergence does not occur). However, by encoding contextual user interaction information into the user identities of the user, the user embeddings system 104 can use the user identities as labels to train the interaction-to-vector neural network in a semi-supervised manner.

Indeed, the user embeddings system 104 encodes contextual information into the user identities of each user based on the user interaction data. Then, using the encoded user identities, the user embeddings system 104 trains and tune weights and parameters of the weighted matrices, which can be used as user embeddings for each user. In this manner, users that have similar contexts with respect to user interactions will have similar learned user embeddings.

FIG. 4B illustrates an alternative configuration of an interaction-to-vector neural network 400'. As shown in FIG. 4B, the interaction-to-vector neural network 400' also includes an input layer, a hidden layer, and an output layer similar to the interaction-to-vector neural network 400 described above with respect to FIG. 4A. Likewise, the interaction-to-vector neural network 400' includes a first weighted matrix (i.e., W) and a second weighted matrix (i.e., W'). In addition, each of the elements of the interaction-to-vector neural network 400' has similar dimensions as the interaction-to-vector neural network 400 previously described.

In the illustrated embodiment shown in FIG. 4B, $h_i$ equals $W^T x_i$, where $h_i$ represent a parameter in the hidden layer, W represents the first weighted matrix, T represents taking a transpose of the first weighted matrix, and $x_i$ represents the input vector in the input layer. In addition, $u_c$ equals $W'^T h_i$ or $W'^T W^T x_i$, where $u_c$ represents the value of the output (i.e., raw output), and C represents a number of unique user identities. Further, $y_c$ equals Softmax($u_c$) or Softmax($W'^T W^T x_i$), where y represents an output vector after applying the softmax regression classifier (e.g., the probability that a given user interface is similar to an input user identifier).

As mentioned above, FIG. 4C builds upon FIG. 4A and provides an example of training the interaction-to-vector neural network 400. FIG. 4C includes the interaction-to-vector neural network 400 shown in FIG. 4A. Additionally, FIG. 4C includes training data 460 having a target user identifier vector 462. Also, FIG. 4C includes a context window encoder 464.

The target user identifier vector 462 can represent the user IDs extracted or obtained from the user interaction table as described above with respect to FIG. 3E. More particularly, the target user identifier vector 462 includes a vector of user identifiers where each user identifier is adjacent to other user identifiers that share similar contexts with the user regarding interacting with content items. Indeed, the adjacent user identifiers correspond to other users that interacted with the same content items using the same type of user interaction around the same time as the user. Further, as shown in FIG. 3E, a user identifier for a user can appear in the target user identifier vector 462 multiple times and be adjacent to other user identifiers.

In various embodiments, to train the interaction-to-vector neural network 400, the user embeddings system 104 selects a user identifier from the target user identifier vector 462 and provides the selected user identifier 468 to the input layer 410. In response, the input layer 410 generates an encoded input vector 412 (e.g., using one-hot encoding) that corresponds to the provider user identifier. For instance, as detailed further below, the user embeddings system 104 encodes the selected user identifier as "1" and all other user identifiers as "0" in an input vector 412. The user embeddings system 104 then feeds the input vector 412 through the interaction-to-vector neural network 400 as described above.

In addition, the user embeddings system 104 provides the target user identifier vector 462 to the context window encoder 464 with an indication of the selected user identifier 468 in the target user identifier vector 462. For example, the user embeddings system 104 provides a pointer referencing a position in the target user identifier vector 462 (e.g., the fifth entry). In alternative or additional embodiments, the user embeddings system 104 begins at the first entry of the target user identifier vector 462 and progresses through each entry systematically. In this manner, the context window encoder 464 automatically identifies which user identifier is being trained in the interaction-to-vector neural network 400 for each training iteration.

In some embodiments, the context window encoder 464 generates and provides context user identifier vectors 466 to the loss layer 450. Largely, context user identifiers are defined by a window (i.e., a context window) of predefined length (e.g., 3 entries, 5 entries, 15 entries) that includes the selected user identifier from the target user identifier vector 462 as well as user identifiers located before and/or after the selected user identifier. For example, if the context widow has a size of five (i.e., five entries), the context window encoder 464 identifies two entries before and two entries after the selected user identifier in the target user identifier vector 462. If the selected user identifier does not have two entries before or after, the context window encoder 464 can reduce the content window size or shift the context window over.

To briefly demonstrate, FIG. 4D shows an example target user identifier vector 462 that includes eight unique user identifiers (e.g., User 1-User 8). Notably, the target user identifier vector 462 in FIG. 4D is based on the list of User IDs from FIG. 3E. In addition, FIG. 4D shows a context window 470 having a size of three entries, which is centered on a selected user identifier 468 and includes the user identifiers before and after the selected user identifier 468. To illustrate, the fifth entry of User 5 is the selected user identifier 468 and thus, the fourth entry (i.e., User 1) and the sixth entry (i.e., User 3) are included in the context window 470. Accordingly, the context window encoder 464 identifies the fourth entry as the first context user identifier 472a and the sixth entry as the second context user identifier 472b.

In various embodiments, the context window encoder 464 generates context user identifier vectors 466 for the context user identifiers within the context window 470. To illustrate, the context window encoder 464 identifies that the first context user identifier 472a corresponds to User 1. Accordingly, the context window encoder 464 generates a first context user identifier vector 466a (e.g., utilizing one-hot encoding) that indicates User 1 as a context user identifier. As shown, the context window encoder 464 initializes a vector having eight null entries (e.g., set to 0) corresponding to the eight unique user identifiers. Further, the context user identifier vectors 466 sets the first entry to one to indicate that the User 1 is the first context user identifier 472a. The context window encoder 464 repeats a similar process to generate the second context user identifier vector 466b indicating User 3 as the second context user identifier 472b.

Also, as mentioned above, the user embeddings system 104 provides the selected user identifier 468 to the input layer 410 of the interaction-to-vector neural network 400. Based on the selected user identifier 468 the user embeddings system 104 generates a one-hot encoded vector that indicates the selected user identifier 468. As shown in FIG. 4D, the input vector 412 encodes User 1 based on User 1 being the selected user identifier 468.

Returning to FIG. 4C, the user embeddings system 104 provides the context user identifier vectors 466 to the loss layers 450. In response, the loss layer 450 compares the output probabilities received from the classification layer 440 to the context user identifier vectors 466 to calculate the error loss for each output probability. The user embeddings system 104 can total the error loss and back propagate the total error loss to layers and matrices of the interaction-to-vector neural network 400 in the form or error loss feedback vector 454.

To illustrate using the example target user identifier vector 462 from FIG. 4D, when training the interaction-to-vector neural network 400 using the selected user identifier 468 (e.g., User 5) encoded as the input vector 412, the interaction-to-vector neural network 400 produces the probabilities that each of the other users in the user interaction data share a similar context to User 5. For example, the probabilities that User 1 to User 8 share a similar context to User 5 is $y_1$ to $y_8$, respectively (e.g., $y_1$ representing the first output probability 442a). Additionally, the context user identifier vectors 466 provide the ground truth probabilities and indicate that, in one instance, User 1 has a similar context to User 5 (e.g., $\hat{y}_1$ or a first ground truth output probability), and in another instance, User 3 has a similar context to User 5 (e.g., $\hat{y}_3$).

Using the ground truth from the context user identifier vectors 466 (e.g., the first context user identifier vector 466a and the second context user identifier vector 466b) and the output probabilities of the interaction-to-vector neural network 400 corresponding to the selected user identifier 468 (e.g., User 5) encoded as the input vector 412, the loss layer 450 can determine loss vectors corresponding to at least each of the context user identifier vectors 466. More particularly, in various embodiments, the loss layer 450 subtracts the predicted probabilities that User 1 is similar to User 5 (e.g., $p_1$ or $[p_{1_1}, p_{1_2}, p_{1_3}, p_{1_4}, p_{1_5}, p_{1_6}, p_{1_7}, p_{1_8}]$) from the ground truth in the first context user identifier vector 466a (e.g., [1,0,0,0,0,0,0,0]) to determine the first loss vector 452a (e.g., $[1-p_{1_1}, 0-p_{1_2}, 0-p_{1_3}, 0-p_{1_4}, 0-p_{1_5}, 0-p_{1_6}, 0-p_{1_7}, 0-p_{1_8}]$)). The loss layer 450 can repeat the same actions based on the predicted probabilities that User 3 is similar to User 5 (e.g., $p_3$) and the second context user identifier vector 466b (e.g., [0,0,1,0,0,0,0,0]). Further, the loss layer 450 can combine the loss vectors to determine the error loss feedback vector 454 used to train the interaction-to-vector neural network 400.

Once the error loss feedback vector 454 is backpropagated to the interaction-to-vector neural network 400, the user embeddings system 104 increments or slides the position of the context window 470 along the target user identifier vector 462 and repeats the above actions for the next selected user identifier and context user identifiers. Each time the user embeddings system 104 slides the context window 470, the user embeddings system 104 calculates and provides the error loss feedback vector 454 back to the interaction-to-vector neural network 400 as part of the training. The user embeddings system 104 can slide the context window 470 along the target user identifier vector 462 until the end of the vector is reached.

As described above, the user embeddings system 104 trains the layers and/or matrices of the interaction-to-vector neural network 400 using the error loss feedback vector 454 until the overall error loss is minimized. For example, in one or more embodiments, the user embeddings system 104 tunes the weights of the first weighted matrix 414 and the second weighted matrix 424 until the overall error loss is minimized at the loss layer 450. In some embodiments, the user embeddings system 104 decreases the learning rate as training progresses.

Once the user embeddings system 104 trains the interaction-to-vector neural network 400, the user embeddings system 104 can identify user embeddings for each of the users. In one or more embodiments, the user embeddings system 104 utilizes the first weighted matrix 414 as the user embeddings. In alternative embodiments, the user embeddings system 104 utilizes the second weighted matrix 424 as the user embeddings. In other embodiments, the user embeddings system 104 utilizes a combination (e.g., an average or a weighted average) of the first weighted matrix 414 and the second weighted matrix 424 as the user embeddings.

Figure 5:
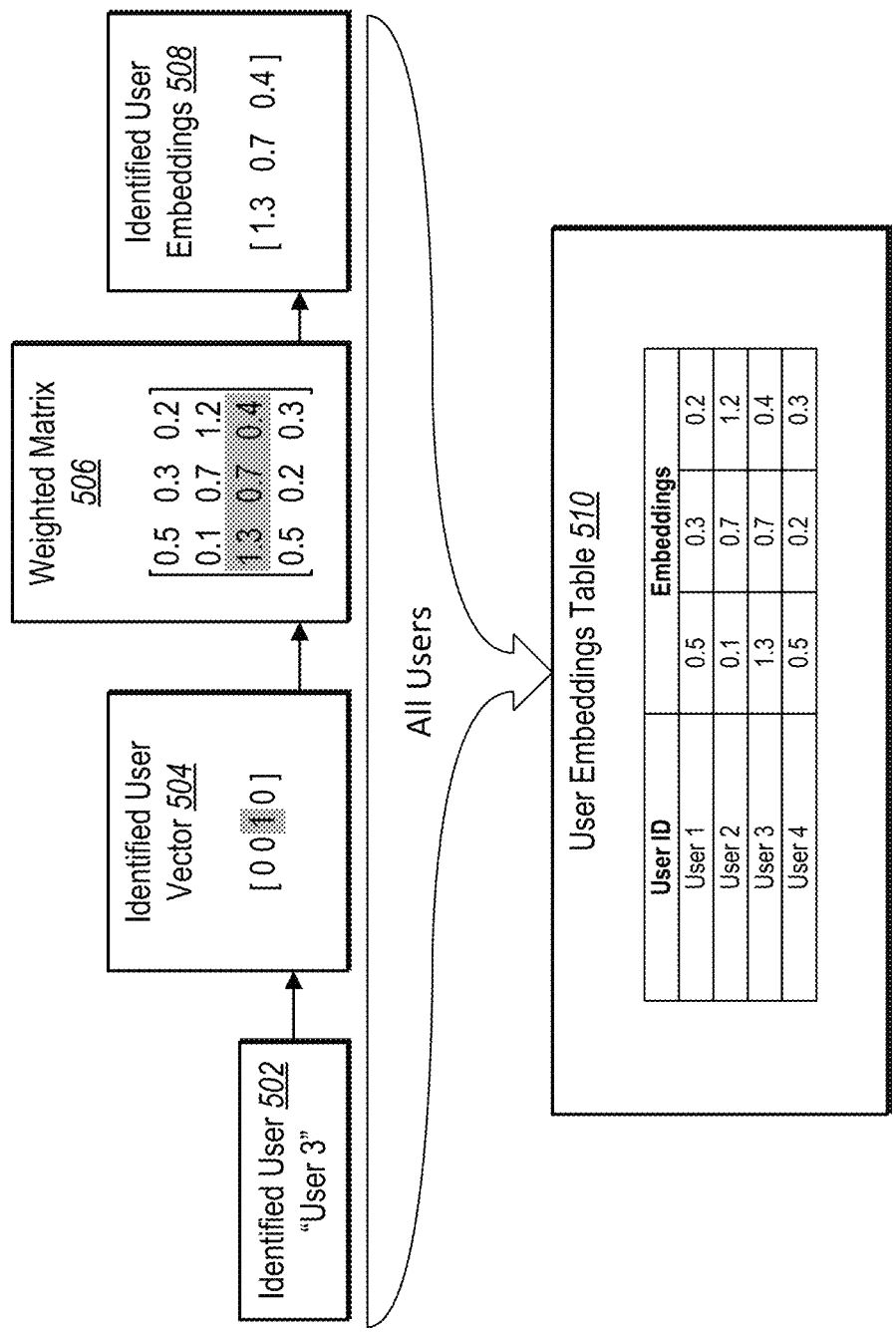
FIG. 5 illustrates utilizing a weighted matrix to identify learned user embeddings in accordance with one or more embodiments.

To illustrate, FIG. 5 shows the user embeddings system 104 utilizing a weighted matrix to identify the learned user embeddings. More particularly, FIG. 5 illustrates an example embodiment of the user embeddings system 104 identifying user embeddings from a weighted matrix (e.g., the first weighted matrix) and storing the user embeddings. As shown, FIG. 5 includes an identified user 502, an identified user vector 504, a weighted matrix 506, and an identified user embeddings 508. FIG. 5 also shows a User Embeddings Table 510 identified for all of the users.

In one or more embodiments, the user embeddings system 104 selects or identifies a user from the user interaction data (e.g., the identified user 502). As shown in FIG. 5, the user embeddings system 104 selects User 3 as the identified user 502.

Upon selecting the identified user 502, the user embeddings system 104 generates an identified user vector 504 corresponding to the user. For example, as shown, the user embeddings system 104 generates a one-hot encoded vector that indicates User 3 as the identified user 502. In various embodiments, the user embeddings system 104 generates the identified user vector 504 to properly identify the correct features in the weighted matrix 506, as described next.

As shown in FIG. 5, the user embeddings system 104 identifies a weighted matrix 506 that includes learned weights that properly encode the context of a user. In some embodiments, the weighted matrix 506 is the trained first weighted matrix described in FIG. 4C. In alternative embodiments, the weighted matrix 506 is the trained second weighted matrix or a combination of the first weighted matrix and the second weighted matrix described previously.

To identify the weights corresponding to the identified user 502, in various embodiments, the user embeddings system 104 multiplies the identified user vector 504 with the weighted matrix 506. Indeed, by multiplying the identified user vector 504 with the weighted matrix 506, the user embeddings system 104 obtains the identified user embeddings 508 (e.g., vectorized user embeddings) shown in FIG. 5. In addition, the user embeddings system 104 can store the identified user embeddings 508 in the user embeddings table 510. Further, the user embeddings system 104 can repeat the above actions for each of the users to populate the user embeddings table 510 with each user's embeddings.

Upon obtaining the learned user embeddings for each user, the user embeddings system 104 can perform additional actions to identify users that share similar contexts with each other with respect to content items and/or user interactions. In particular, the user embeddings system 104 can utilize the user embeddings to identify other users that share the same behaviors, patterns, traits, and habits of a given user or given a set of users based on each user's interaction with content items. Notably, the user embeddings system 104 can determine user comparisons using user embeddings because each of the user embeddings is stored as a uniform homogeneous vector irrespective of the number of user interactions or content items a given user has previously performed.

To illustrate, in one or more embodiments, the user embeddings system 104 utilizes the user embeddings to perform various use cases like clustering segmentation, segment expansion, and as input to other deep learning/traditional predictive models.

FIGS. 4A-4D and FIG. 5 described various embodiments of training an interaction-to-vector neural network and generating user embeddings for users. Accordingly, the actions and algorithms described in connection with FIGS. 4A-4D and FIG. 5 provide example structure for performing a step for generating user embeddings for the plurality of users based on the organized user interaction data to obtain homogenous embedding representations from heterogeneous user interaction data. More particularly, the actions and algorithms described in training the interaction-to-vector neural network 400 with respect to FIGS. 4A-4D as well as using the trained interaction-to-vector neural network 400 to obtain user embeddings with respect to FIG. 5 can provide structure for performing a step for generating user embeddings for the plurality of users based on the organized user interaction data to obtain homogenous embedding representations from heterogeneous user interaction data.

As mentioned above, the embodiments of the user embeddings system 104 outperform conventional systems. In particular, researchers compared embodiments of the user embeddings system to conventional systems for predicting a task and found that the user embeddings system outperformed the conventional systems. The following provides results obtained by the researchers of embodiments of the user embeddings system 104 outperforming conventional systems.

More specifically, the researchers set out to test how user behavioral features (e.g., user embeddings of one or more of the embodiments disclosed herein) compare to manual features created for a prediction task. For the prediction task, the researchers selected predicting the probability that a user will interact (e.g., select) a content item given the user's past behavioral traits (i.e., content item interactions) and given the time a content item is provided to the user. For example, the researchers tested the accuracy of predicting the probability that a user would select a content item sent via an email at a particular time based on utilizing the user embeddings learned from one or more of the embodiments disclosed herein.

Further, the researchers tested the user embeddings system 104 against a state-of-the-art prediction system that necessitated manually defining features (i.e., embeddings) for the prediction model. For example, the users manually defined the following features for the state-of-the-art prediction system, as shown in Table 1 below.

TABLE 1

Manually Defined Features

1. Number of content items shown to the user in the last 7 days
2. Number of content items shown to the user in the last 14 days
3. Number of content items shown to the user in the last 21 days
4. Number of a first user interaction type with the content items in the last 7 days
5. Number of a first user interaction type with the content items in the last 14 days
6. Number of a first user interaction type with the content items in the last 21 days
7. Number of a second user interaction type with the content items in the last 7 days
8. Number of a second user interaction type with the content items in the last 14 days
9. Number of a second user interaction type with the content items in the last 21 days As shown in Table 1, the researchers defined 9 features that included the number of content items shown to users over the previous 7, 14, and 21 days as well as the number of user interactions with the content items through a first interaction type (e.g., opening an email) and a second interaction type (e.g., selecting a content item in the email) over the previous 7, 14, and 21 days.

The researchers trained two neural networks. First, the state-of-the-art prediction system with the above manually defined features and second, the interaction-to-vector neural network with the behavior features (i.e., user embeddings) automatically learned through training in the manner described above with respect to the user embeddings system 104. The researchers found that the user embeddings system 104 described herein reduced testing error by about 8% and improved accuracy by about 0.70. Further, using the user embeddings from the two systems, the researchers found that the user embeddings system 104 provided predictions that were at least 5% better than the state-of-the-art prediction system.

Figure 6:
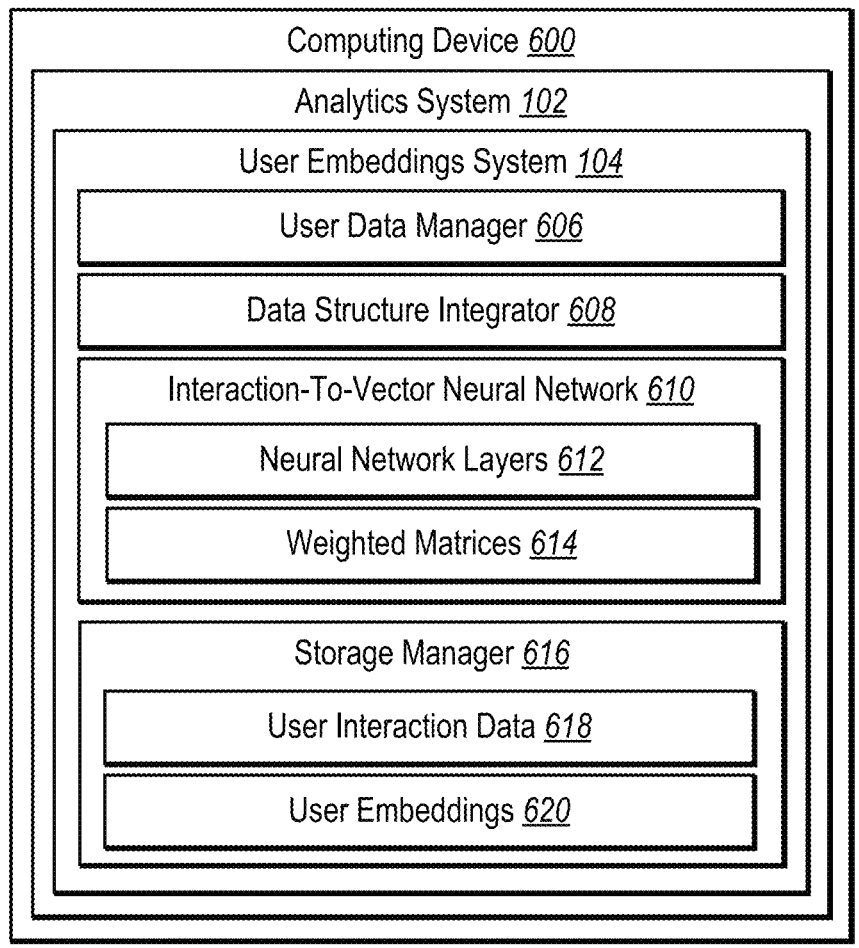
FIG. 6 illustrates a schematic diagram of a user embeddings system in accordance with one or more embodiments.

Referring now to FIG. 6, additional detail will be provided regarding capabilities and components of the user embeddings system 104 in accordance with one or more embodiments. In particular, FIG. 6 shows a schematic diagram of an example architecture of the user embeddings system 104 located within an analytics system 102 (described previously) and hosted on a computing device 600. The user embeddings system 104 can represent one or more embodiments of the user embeddings system 104 described previously.

As shown, the user embeddings system 104 is located on a computing device 600 within an analytics system 102, as described above. In general, the computing device 600 may represent various types of computing devices (e.g., the server device 101, the third-party server device 108, or an administrator client device). In some embodiments, the computing device 600 represents the user client devices 110a-110n. To demonstrate, in various embodiments, the computing device 600 is a non-mobile device, such as a desktop or server, or a client device. In other embodiments, the computing device 600 is a mobile device, such as a mobile telephone, a smartphone, a PDA, a tablet, a laptop, etc. Additional details with regard to the computing device 600 are discussed below as well as with respect to FIG. 8.

As illustrated in FIG. 6, the user embeddings system 104 includes various components for performing the processes and features described herein. For example, the user embeddings system 104 includes a user data manager 606, a data structure integrator 608, an interaction-to-vector neural network 610, and a storage manager 616. Each of these components is described below in turn.

As shown, the user embeddings system 104 includes the user data manager 606. In general, the user data manager 606 can receive, access, detect, store, copy, identify, determine, filter, remove, and/or organize user interaction data 618. In one or more embodiments, user interaction data includes interactions between a user and content items as well as metadata associated with the user (e.g., user identifier), the content items (e.g., content item identifier), and the interaction (e.g., time, type, number, frequency). In some embodiments, the user data manager 606 can store and access the user interaction data 618 from the storage manager 616 on the computing device 600.

As shown, the user embeddings system 104 includes a data structure integrator 608. The data structure integrator 608 can determine, identify, analyze, structure, organize, arrange, prioritize, rank, edit, modify, copy, remove, extract, parse, filter, and/or integrate the user interaction data 618 to prepare the user interaction data for training an interaction-to-vector neural network 610. For example, as described above in detail, the data structure integrator 608 can organize the user interaction data 618 in a hierarchy manner to encode contextual relationships between user interactions within the user interaction data. Further, as described above, the data structure integrator 608 can isolate a list of user identifiers from the other data and metadata of the user interaction data, which the user embeddings system 104 can utilize to train the interaction-to-vector neural network, as described next.

As shown, the user embeddings system 104 includes the interaction-to-vector neural network 610. The interaction-to-vector neural network 610 includes a number of neural network layers 612, including an input layer, one or more hidden layers, an output layer, a classification layer, and/or a loss layer. In various embodiments, the user embeddings system 104 trains one or more of these neural network layers 612 through via back propagation, as described above in connection with FIGS. 4A-4D.

In addition, the interaction-to-vector neural network 610 includes weighted matrices 614. For example, the interaction-to-vector neural network includes a first weighted matrix between the input layer and a hidden layer. In addition, the interaction-to-vector neural network includes one or more second weighted matrices between the hidden layer and the output layer. In one or more embodiments, the user embeddings system 104 tunes the weighted matrices 614, as described above in connection with FIGS. 4A-4D.

Upon training the interaction-to-vector neural network 610, the user embeddings system 104 can identify user embeddings 620 from one or more of the trained weighted matrices 614. For example, in one or more embodiments, as described above, the user embeddings system 104 utilizes the learned features and weights of the first weighted matrix as the user embeddings 620 for each user.

In some embodiments, the user embeddings system 104 saves the user embeddings 620 within the storage manager 616, as shown in FIG. 6. In this manner, the user embeddings system 104 can retrieve and utilize the user embeddings 620 at a future time for various applications, as described above. For example, the user embeddings system 104 can utilize the user embeddings 620 to perform various prediction use cases like clustering segmentation, segment expansion, and as input to other deep learning/traditional predictive models.

Each of the components 606-620 of the user embeddings system 104 can include software, hardware, or both. For example, the components 606-620 can include one or more instructions stored on a computer-readable storage medium and executable by processors of one or more computing devices, such as a client device or server device. When executed by the one or more processors, the computer-executable instructions of the user embeddings system 104 can cause the computing device(s) to perform the feature learning methods described herein. Alternatively, the components 606-620 can include hardware, such as a special-purpose processing device to perform a certain function or group of functions. Alternatively, the components 606-620 of the user embeddings system 104 can include a combination of computer-executable instructions and hardware.

Furthermore, the components 606-620 of the user embeddings system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 606-620 may be implemented as a stand-alone application, such as a desktop or mobile application. Furthermore, the components 606-620 may be implemented as one or more web-based applications hosted on a remote server. The components 606-620 may also be implemented in a suite of mobile device applications or "apps." To illustrate, the components 606-620 may be implemented in an application, including but not limited to ADOBE® CLOUD PLATFORM or ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE," "ADOBE ANALYTICS CLOUD," "ADOBE ANALYTICS," "ADOBE AUDIENCE MANAGER," "ADOBE CAMPAIGN," "ADOBE EXPERIENCE MANAGER," and "ADOBE TARGET" are either registered trademarks or trademarks of Adobe Systems Incorporated in the United States and/or other countries.

Figure 7:
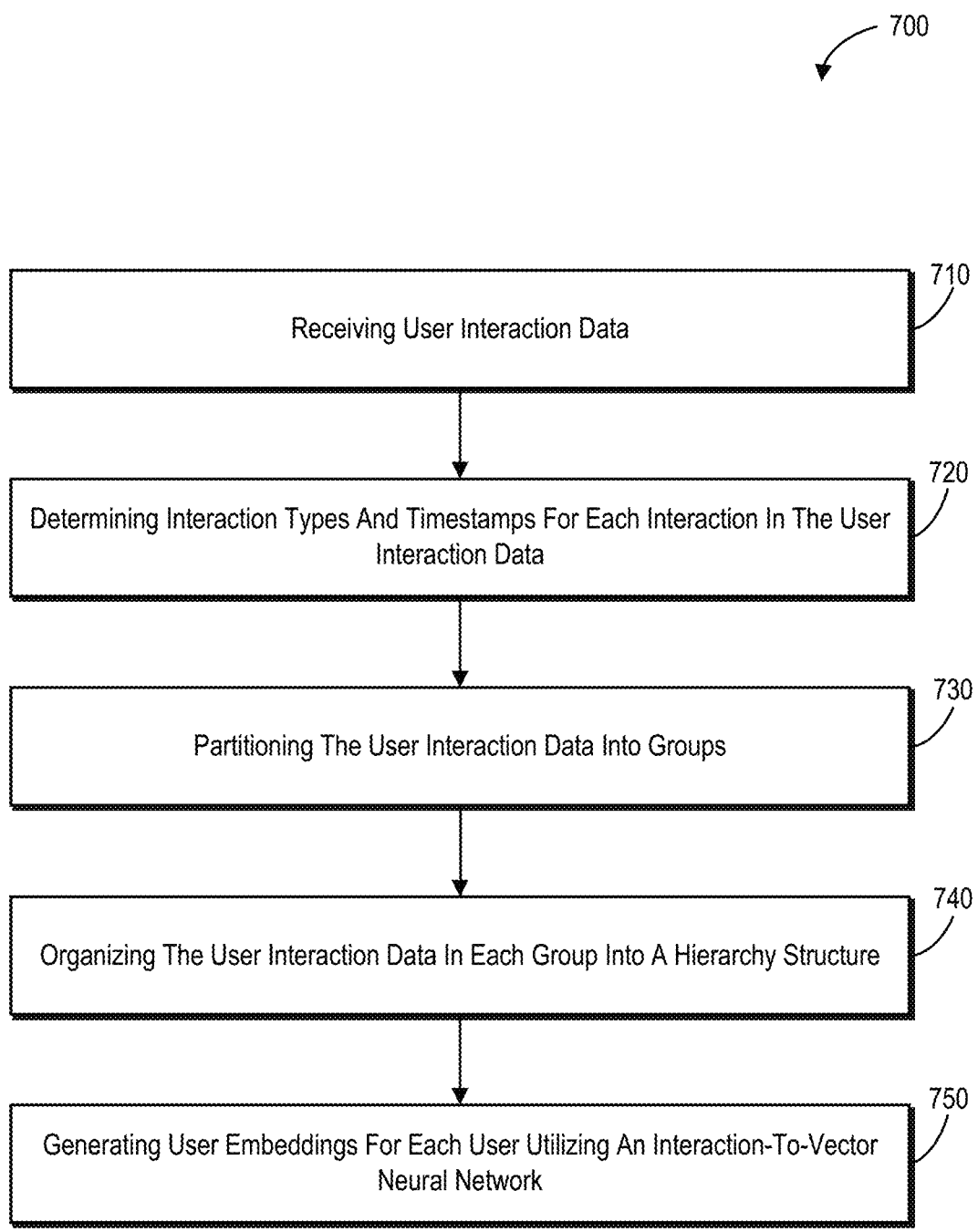
FIG. 7 illustrates a flowchart of a series of acts for generating user embedding representations in accordance with one or more embodiments.

FIGS. 1-6, the corresponding text, and the examples provide a number of different methods, systems, devices, and non-transitory computer-readable media of the user embeddings system 104. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for generating user embedding representations in accordance with one or more embodiments. While FIG. 7 illustrates acts according to one embodiment, alternative embodiments may omit, add to, reorder, and/or modify any of the acts shown in FIG. 7. The series of acts 700 can be performed as part of a method. Alternatively, a non-transitory computer-readable medium can comprise instructions that, when executed by one or more processors, cause a computing device to perform the series of acts 700 of FIG. 7. In some embodiments, a system can perform the series of acts 700.

In one or more embodiments, the series of acts 700 is implemented on one or more computing devices, such as the computing device 600 or the server device 101. In addition, in some embodiments, the series of acts 700 is implemented in a digital environment (e.g., a digital medium environment) for tracking user interactions with content items. For example, the series of acts 700 is implemented on a computing device having memory that stores user interaction data having indications of a plurality of users performing a plurality of interactions with a plurality of content items.

The series of acts 700 includes an act 710 of receiving user interaction data. In particular, the act 710 can involve receiving user interaction data including indications of a plurality of users performing a plurality of interactions with a plurality of content items. In some embodiments, the user interaction data is heterogeneous where a first user of the plurality of users has a different number of interactions with the plurality of content items than a second user of the plurality of users. In one or more embodiments, the plurality of interactions includes a user of the plurality of users downloading, opening, viewing, selecting, or sharing a content item of the plurality of content items.

The series of acts 700 includes an act 720 of determining interaction types and timestamps for each interaction in the user interaction data. In particular, the act 720 can involve determining a user identifier, an interaction type and an interaction timestamp for each of the plurality of interactions. In some embodiments, the act 720 includes determining additional user interaction information, such as metadata, for each of the plurality of interactions.

As shown, the series of acts also includes an act 730 of partitioning the user interaction data into groups. In particular, the act 730 can involve partitioning the user interaction data into subsets based on each content item of the plurality of content items. In various embodiments, the act 730 includes temporally ordering each content item subset (relative to other content items of the plurality of content items) based on the first or last occurring interaction timestamp within each content item subset.

As shown, the series of acts 700 additionally includes an act 740 of organizing the user interaction data in each group into a hierarchy structure. In particular, the act 740 can involve organizing the user interaction data in each subset into a hierarchy structure based on the interaction type followed by the interaction timestamp. In some embodiments, the act 740 can include grouping the user interaction data in each content item subset based on the interaction type of the user interaction data in the content item subset and ordering the user interaction data in each content item group within each content item subset temporally based on the interaction timestamp. In additional embodiments, the act 740 includes identifying user identifiers associated with the plurality of users from the organized user interaction data and extracting the user identifiers from the organized user interaction data while maintaining the ordering of the user identifiers.

In additional embodiments, the act 740 includes ordering the user interaction data in each content item group within each content item subset temporally based on the interaction timestamp. In various embodiments, the act 740 includes extracting user identifiers from the organized user interaction data while maintaining the ordering based on the hierarchy structure.

As shown, the series of acts 700 also includes an act 750 of generating user embeddings for each user utilizing an interaction-to-vector neural network. In particular, the act 750 can involve generating user embeddings for each of the plurality of users utilizing the organized user interaction data and an interaction-to-vector neural network. In some embodiments, the user embeddings for each of the plurality of users is obtained from the learned features (e.g., weights and/or parameters) of first weighted matrix. In one or more embodiments, the user embeddings for each of the plurality of users is obtained from the second weighted matrix or a combination of the first weighted matrix and the second weighted matrix.

In various embodiments, with respect to the act 750, the interaction-to-vector neural network includes an input layer having a vector that includes entries corresponding to each user of the plurality of users, a hidden layer having a hidden vector that includes latent features corresponding to a plurality of embeddings, an output layer that classifies a probability that a target user of the plurality of users corresponds to an input user of the plurality of users, a first weighted matrix between the input layer and the hidden layer including a first set of weights, and a second weighted matrix between the hidden layer and the output layer including a second set of weights. In some embodiments, the interaction-to-vector neural network is a skip-gram architecture.

In additional embodiments, the act 750 includes generating the user embeddings for each of the plurality of users by training the interaction-to-vector neural network based on the organized user interaction data to tune the first weighted matrix and the second weighted matrix. In some embodiments, the act 750 includes generating the user embeddings for each of the plurality of users by training the interaction-to-vector neural network in a semi-supervised manner utilizing the extracted user identifiers to calculate estimated error loss between training iterations. In one or more embodiments, the act 750 includes utilizing the extracted user identities as a ground truth and identifying a trained hidden layer weighted matrix that includes the user embeddings.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
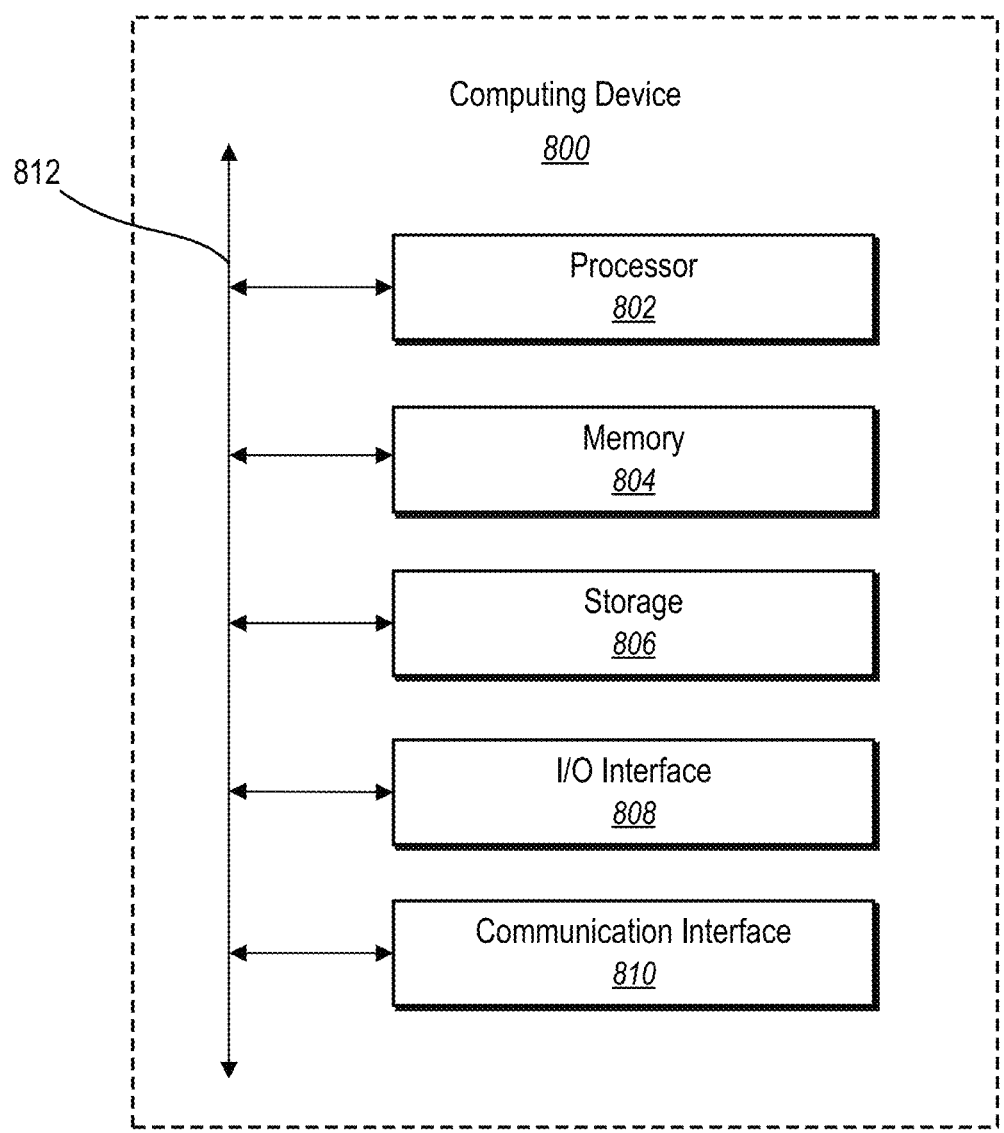
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., computing device 600, server device 101, 108, administrator client device, and user client devices 110a-

110n). In one or more embodiments, the computing device 800 may be a non-mobile device (e.g., a desktop computer or another type of client device). Further, the computing device 800 may be a server device that includes cloud-based processing and storage capabilities. In some embodiments, the computing device 800 may be a mobile device (e.g., a mobile telephone, a smartphone, a PDA, a tablet, a laptop, a camera, a tracker, a watch, a wearable device, etc.).

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for tracking user interactions with content items, a computer-implemented method for generating user embedding representations, comprising:
   obtaining user interaction data comprising indications of a plurality of users performing a plurality of interactions with a plurality of content items;
   organizing the user interaction data based on content items, interaction type, and interaction timestamp into a hierarchy structure to generate organized user interaction data by:
      grouping the user interaction data into content item groups;
      grouping the user interaction data in each of the content item groups into interaction type groups based on interaction types of the user interaction data; and
      ordering the user interaction data in each of the interaction type groups within each content item group; and
   generating user embeddings for the plurality of users from the organized user interaction data by implementing an interaction-to-vector neural network comprising a first weighted matrix, a second weighted matrix, and an output layer that classifies a probability that a target user of the plurality of users corresponds to an input user of the plurality of users, wherein the interaction-to-vector neural network is trained to convert the organized user interaction data comprising heterogeneous user interaction data to homogenous embedding representations by tuning the first weighted matrix and the second weighted matrix.

2. The computer-implemented method of claim 1, wherein ordering the user interaction data is based on the interaction timestamp.

3. The computer-implemented method of claim 2, further comprising:
identifying user identifiers associated with the plurality of users from the organized user interaction data; and
extracting the user identifiers from the organized user interaction data while maintaining ordering of the user identifiers.

4. The computer-implemented method of claim 2, further comprising generating each of the interaction type groups based on an interaction strength factor determined for each content item of the plurality of content items.

5. The computer-implemented method of claim 1, wherein a first user of the plurality of users has a different number of interactions with the plurality of content items than a second user of the plurality of users.

6. The computer-implemented method of claim 1, wherein the user embeddings for the plurality of users are stored as a trained weighted matrix.

7. A non-transitory computer-readable medium storing instructions that, when executed by at least one processor, cause a computer system to:
receive user interaction data comprising indications of a plurality of users performing a plurality of interactions with a plurality of content items;
determine, for each of the plurality of interactions, an interaction type, and an interaction timestamp;
generate organized user interaction data that organizes the user interaction data into a hierarchy structure by:
grouping the user interaction data into content item groups based on content item;
grouping the user interaction data in each content item group into interaction type groups by interaction types; and
sorting the user interaction data in each interaction type group within each content item group by the interaction timestamp; and
generate user embeddings for each of the plurality of users from the organized user interaction data by implementing an interaction-to-vector neural network comprising a first weighted matrix, a second weighted matrix, and an output layer that classifies a probability that a target user of the plurality of users corresponds to an input user of the plurality of users, wherein the interaction-to-vector neural network is trained to convert the organized user interaction data comprising heterogeneous user interaction data to homogenous embedding representations by tuning the first weighted matrix and the second weighted matrix.

8. The non-transitory computer-readable medium of claim 7, wherein the interaction-to-vector neural network comprises:
an input layer comprising a vector that includes entries corresponding to each user of the plurality of users;
a hidden layer comprising a hidden vector that includes latent features corresponding to a plurality of embeddings;
the first weighted matrix between the input layer and the hidden layer comprising a first set of weights; and
the second weighted matrix between the hidden layer and the output layer comprising a second set of weights.

9. The non-transitory computer-readable medium of claim 8, wherein the interaction-to-vector neural network comprises a skip-gram architecture.

10. The non-transitory computer-readable medium of claim 8, wherein the user embeddings for each of the plurality of users comprise the first weighted matrix, the second weighted matrix, or a combination of the first weighted matrix and the second weighted matrix.

11. The non-transitory computer-readable medium of claim 8, wherein a size of the hidden vector in the hidden layer is set by as a hyperparameter.

12. The non-transitory computer-readable medium of claim 7, wherein the instructions cause the computer system to generate the organized user interaction data into the hierarchy structure by ordering the user interaction data in each interaction type pairing within each content item group temporally based on the interaction timestamp.

13. The non-transitory computer-readable medium of claim 12, wherein the instructions further cause the computer system to generate the organized user interaction data into the hierarchy structure by:
identifying user identifiers associated with the plurality of users from the organized user interaction data; and
extracting the user identifiers from the organized user interaction data while maintaining ordering of the user identifiers.

14. The non-transitory computer-readable medium of claim 13, wherein the instructions cause the computer system to generate the user embeddings for each of the plurality of users by training the interaction-to-vector neural network in a semi-supervised manner utilizing the extracted user identifiers to calculate estimated error loss between training iterations.

15. A system for converting heterogeneous user interaction data to homogenous embedding representations comprising:
at least one processor;
a memory that comprises user interaction data having indications of a plurality of users performing a plurality of interactions with a plurality of content items; and
at least one non-transitory computer-readable storage medium storing instructions that, when executed by the at least one processor, cause the system to:
determine, for each of the plurality of interactions, a user identifier, an interaction type, and an interaction timestamp;
generate organized user interaction data that organizes the user interaction data into a hierarchy structure by:
grouping the user interaction data into content item groups based on each content item of the plurality of content items;
grouping the user interaction data in each of the content item groups into interaction type groups by interaction types; and
grouping each of the interaction type groups by the interaction timestamp;
extract user identifiers from the organized user interaction data while maintaining ordering of the user identifiers based on the hierarchy structure; and
generate user embeddings for each of the plurality of users by generating an interaction-to-vector neural network utilizing the extracted user identifiers as a ground truth and identifying a generated hidden layer weighted matrix from within the generated interaction-to-vector neural network that comprises the user embeddings.

16. The system of claim 15, wherein the plurality of interactions comprises a user of the plurality of users downloading, opening, selecting, viewing, or sharing a content item of the plurality of content items.

17. The system of claim 15, wherein the interaction-to-vector neural network comprises:
- an input layer comprising a vector that includes entries corresponding to each user of the plurality of users;
- a hidden layer comprising a hidden vector that includes latent features corresponding to a plurality of embeddings;
- an output layer that classifies a probability that a target user of the plurality of users corresponds to an input user of the plurality of users;
- a first weighted matrix between the input layer and the hidden layer comprising a first set of weights; and
- a second weighted matrix between the hidden layer and the output layer comprising a second set of weights.

18. The system of claim 17, wherein the user embeddings for each of the plurality of users comprise the first weighted matrix.

19. The system of claim 17, wherein the user embeddings for each of the plurality of users comprise a combination of the first weighted matrix and the second weighted matrix.

* * * * *